US009970343B2

(12) United States Patent
Kato

(10) Patent No.: US 9,970,343 B2
(45) Date of Patent: May 15, 2018

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi, Aichi (JP)

(72) Inventor: Akira Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 42 days.

(21) Appl. No.: 15/023,032

(22) PCT Filed: Aug. 5, 2014

(86) PCT No.: PCT/JP2014/004087
§ 371 (c)(1),
(2) Date: Mar. 18, 2016

(87) PCT Pub. No.: WO2015/040781
PCT Pub. Date: Mar. 26, 2015

(65) Prior Publication Data
US 2016/0222856 A1    Aug. 4, 2016

(30) Foreign Application Priority Data

Sep. 19, 2013  (JP) ................. 2013-193926

(51) Int. Cl.
*F01N 3/00* (2006.01)
*F01N 3/20* (2006.01)
(Continued)

(52) U.S. Cl.
CPC ........... *F01N 3/2073* (2013.01); *F01N 3/208* (2013.01); *F02D 41/0235* (2013.01);
(Continued)

(58) Field of Classification Search
CPC ............... F01N 2240/25; F01N 3/2073; F01N 2610/02; F01N 2900/1814
See application file for complete search history.

(56) References Cited

U.S. PATENT DOCUMENTS

2005/0025692 A1\*  2/2005  Becher ................... B01D 53/90
                                                          423/359
2008/0066452 A1    3/2008  Oberski et al.
(Continued)

FOREIGN PATENT DOCUMENTS

JP         2008-075646 A     4/2008
JP         2009-079540 A     4/2009
(Continued)

*Primary Examiner* — Phutthiwat Wongwian
*Assistant Examiner* — Jason Sheppard
(74) *Attorney, Agent, or Firm* — Hunton Andrews Kurth LLP

(57) ABSTRACT

The production efficiency of ammonia is more raised while avoiding the necessity for a user to supply water for himself/ herself in order to produce the ammonia. An exhaust gas purification apparatus comprises a catalyst which purifies an exhaust gas of an internal combustion engine by using ammonia; and an ammonia supplier which supplies the ammonia to the catalyst; wherein the ammonia supplier includes an ammonia producer which produces the ammonia from nitrogen and water; a nitrogen supplier which separates the nitrogen from air and which supplies the nitrogen to the ammonia producer; and a water supplier which separates the water from the exhaust gas of the internal combustion engine and which supplies the water to the ammonia producer.

13 Claims, 8 Drawing Sheets

(51) Int. Cl.
*F02D 41/02* (2006.01)
*F02D 41/04* (2006.01)

(52) U.S. Cl.
CPC ........ *F02D 41/042* (2013.01); *F01N 2240/22* (2013.01); *F01N 2240/25* (2013.01); *F01N 2240/34* (2013.01); *F01N 2610/02* (2013.01); *F01N 2900/1814* (2013.01); *Y02T 10/24* (2013.01)

(56) References Cited

U.S. PATENT DOCUMENTS

| | | |
|---|---|---|
| 2009/0196810 A1 | 8/2009 | Joshi |
| 2010/0236219 A1 | 9/2010 | Oberski et al. |
| 2010/0242864 A1 | 9/2010 | Tanoura et al. |
| 2012/0111001 A1* | 5/2012 | Espinosa ................ F01K 21/04 60/605.2 |

FOREIGN PATENT DOCUMENTS

| | | |
|---|---|---|
| JP | 2009-084615 A | 4/2009 |
| JP | 2012-026036 A | 2/2012 |
| JP | 2013-108480 A | 6/2013 |

* cited by examiner

[Fig. 1]
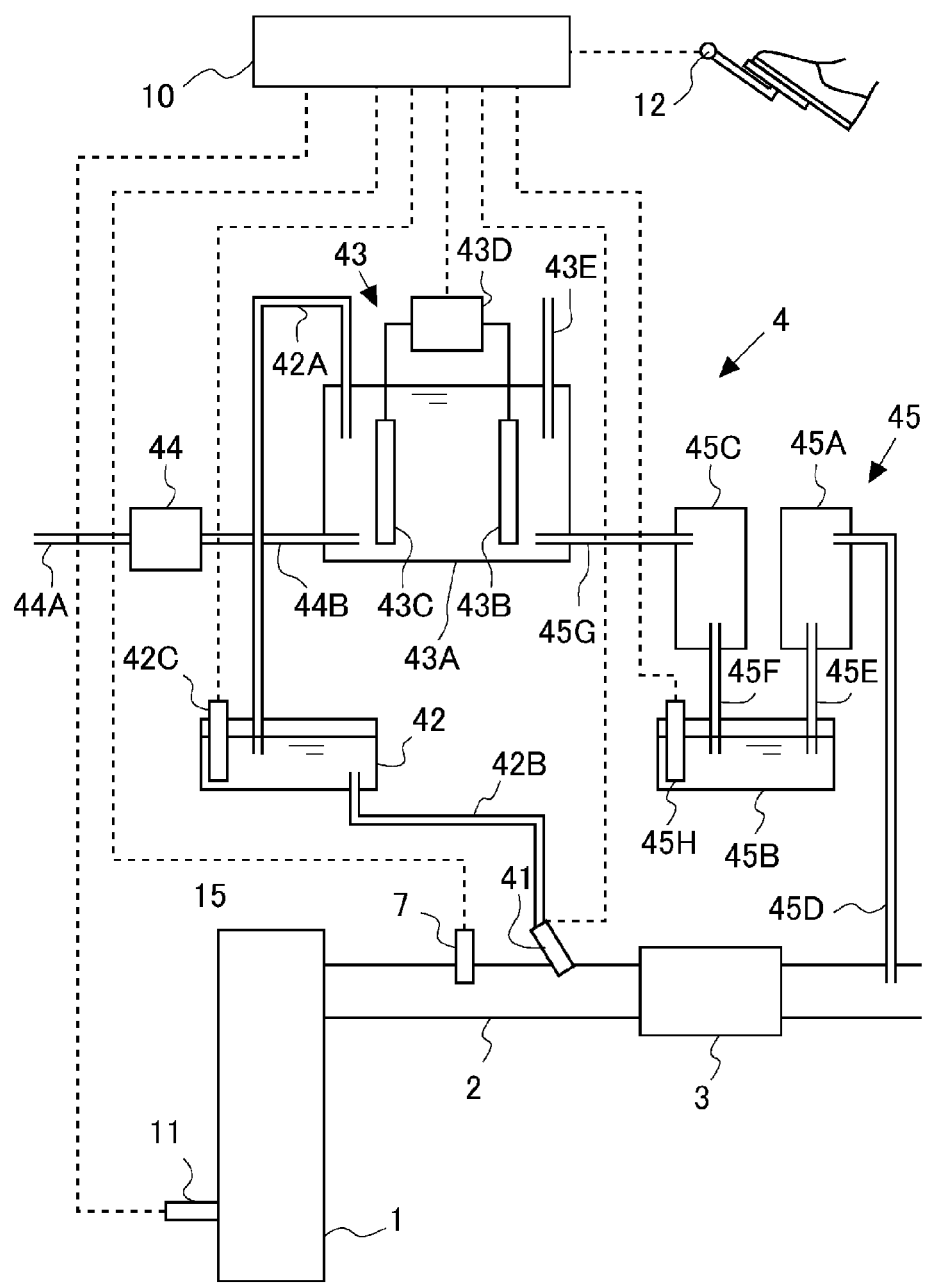

[Fig. 2]
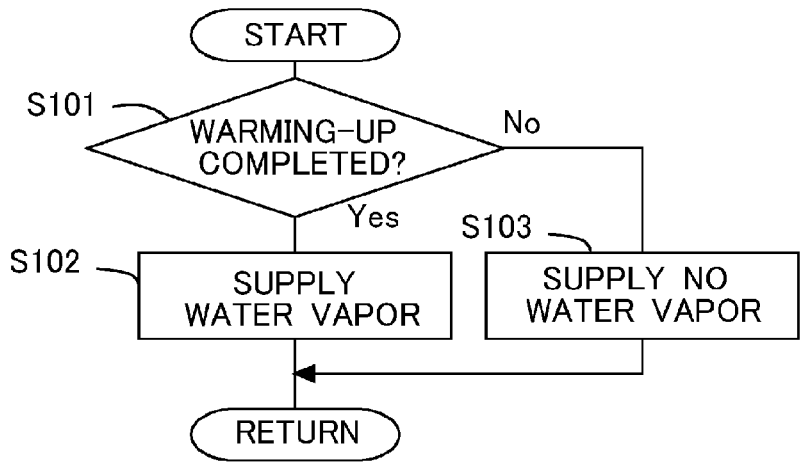
[Fig. 3]
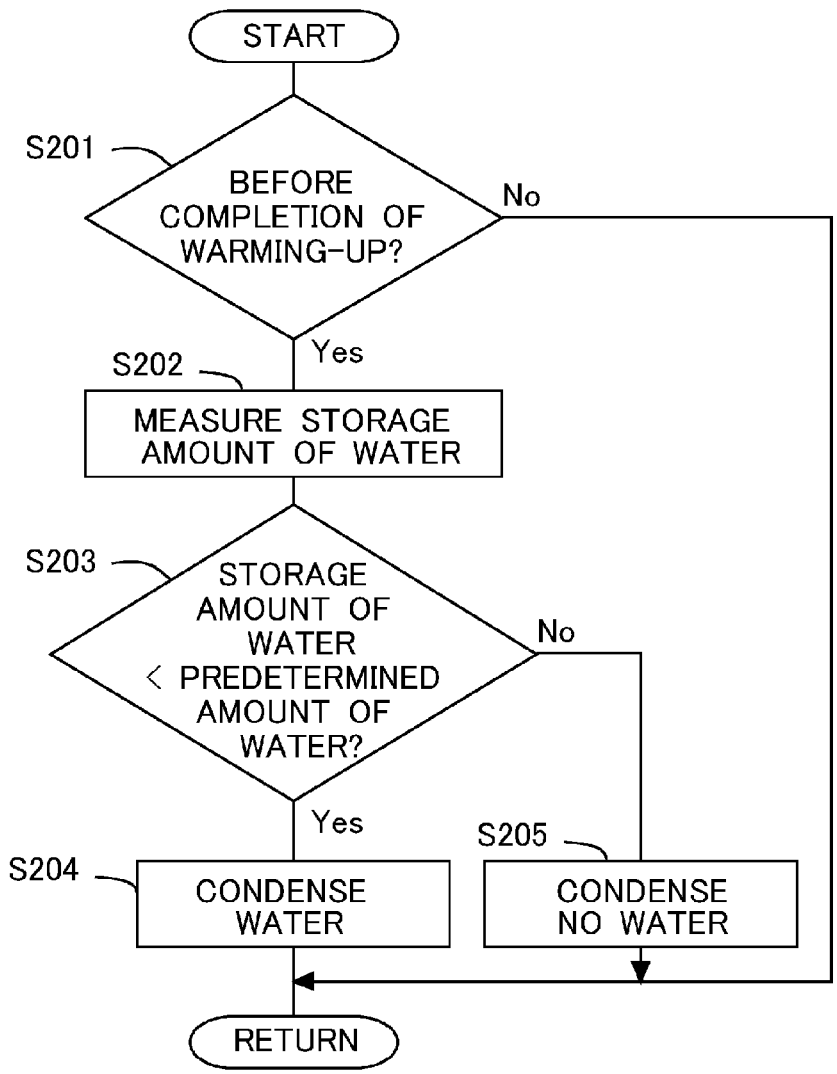

[Fig. 4]
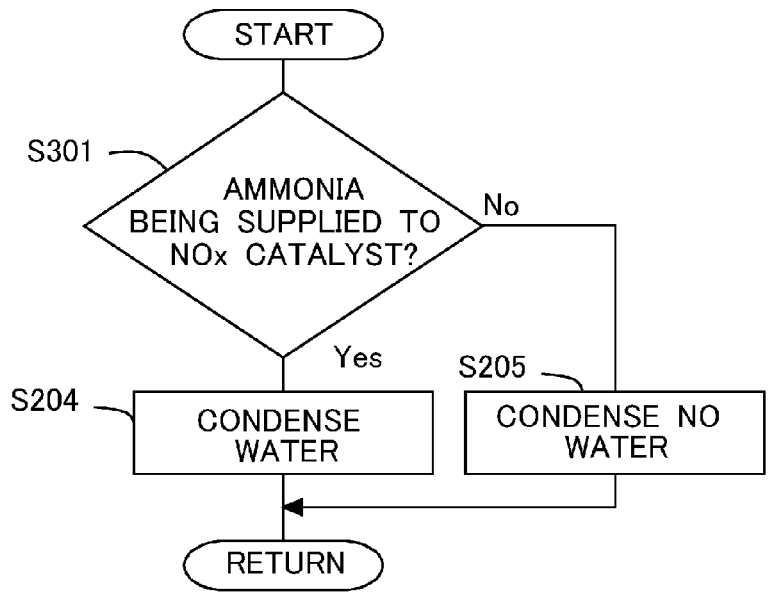
[Fig. 5]
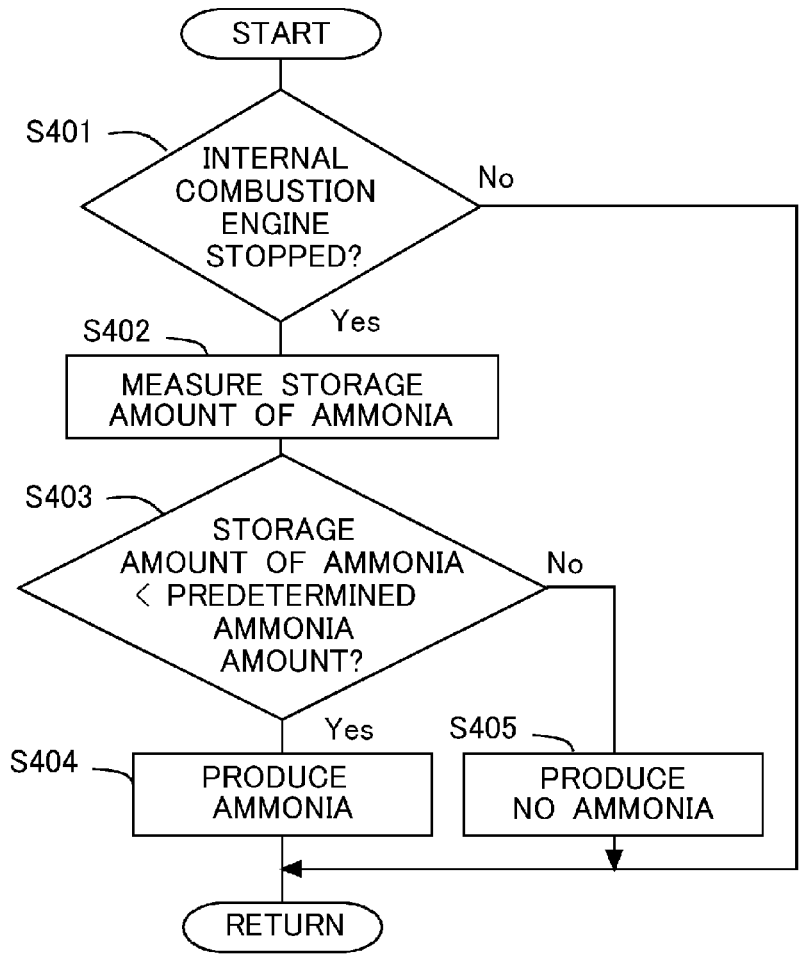

[Fig. 6]
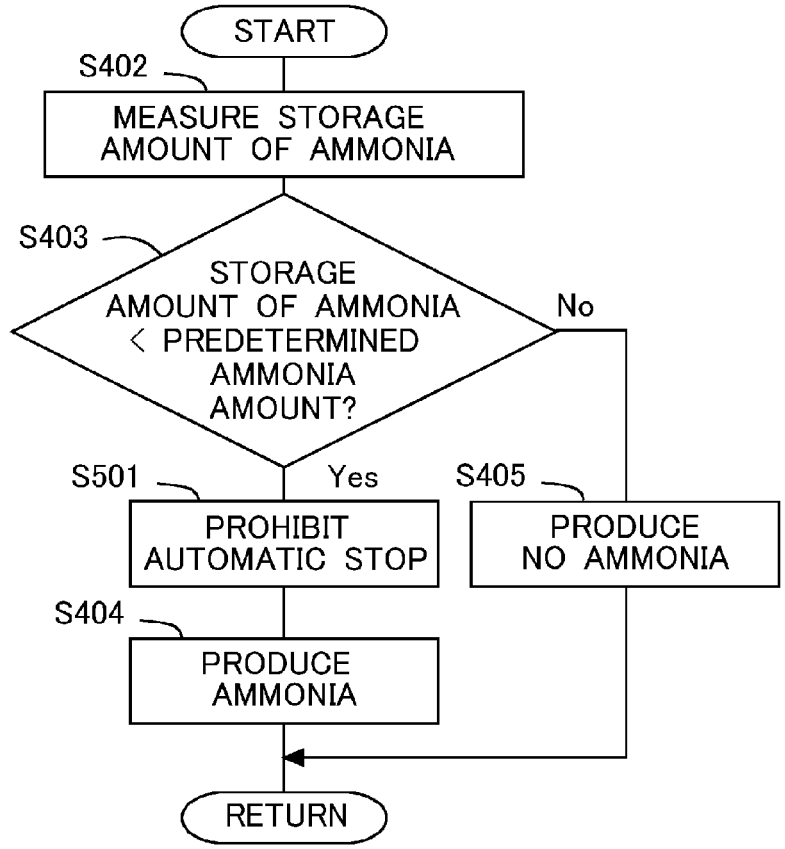
[Fig. 7]
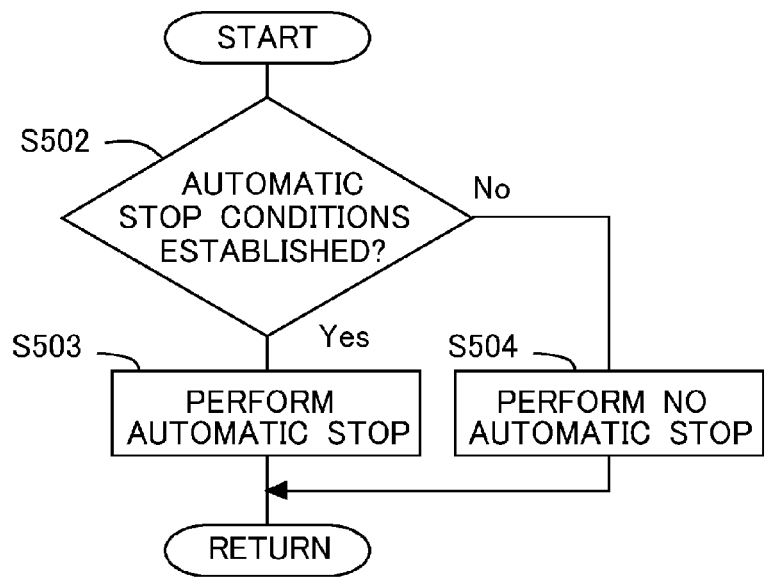

[Fig. 8]
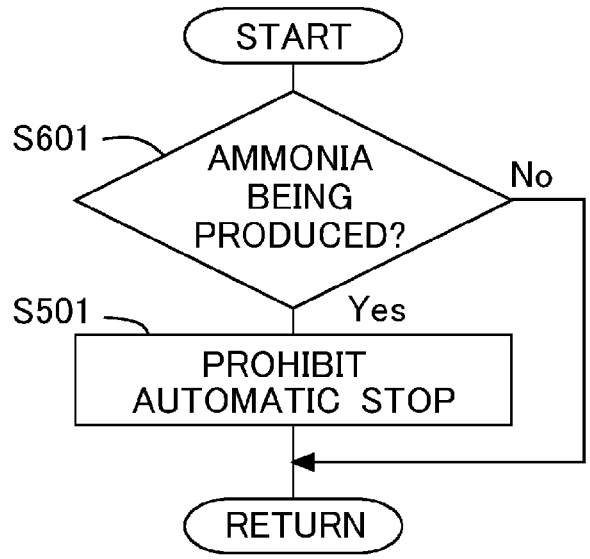
[Fig. 9]
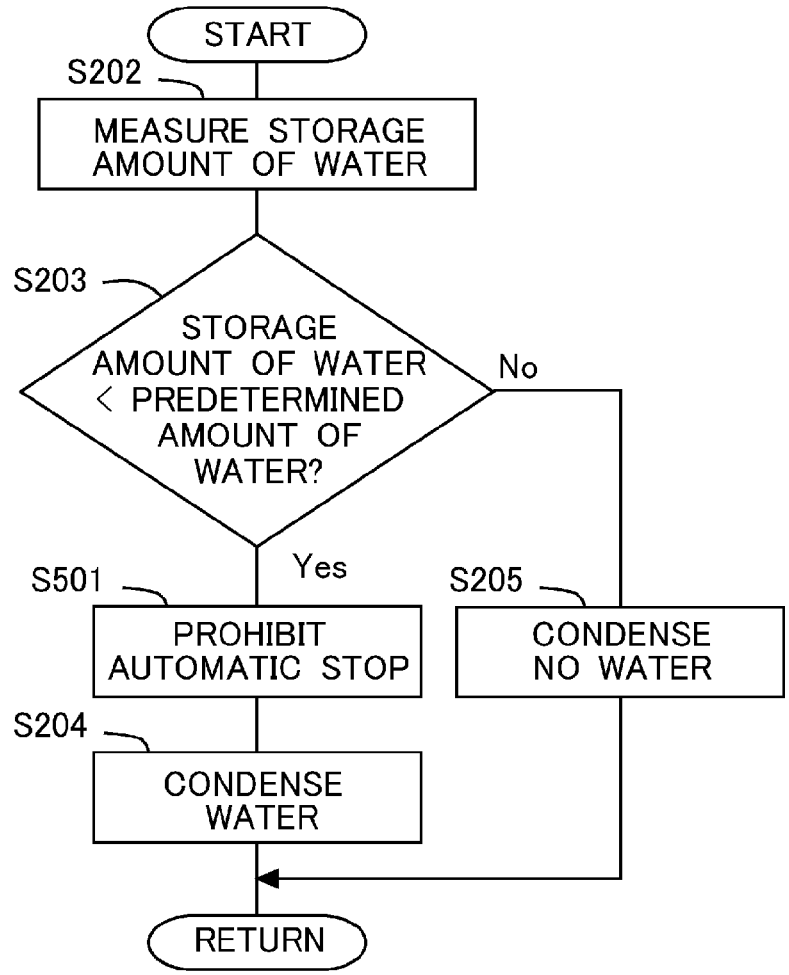

[Fig. 10]
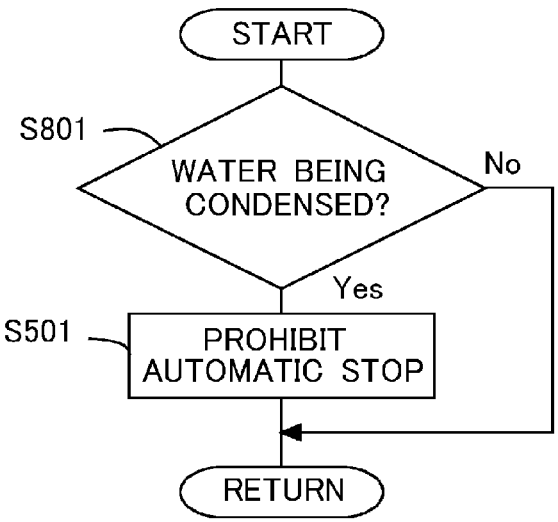
[Fig. 11]
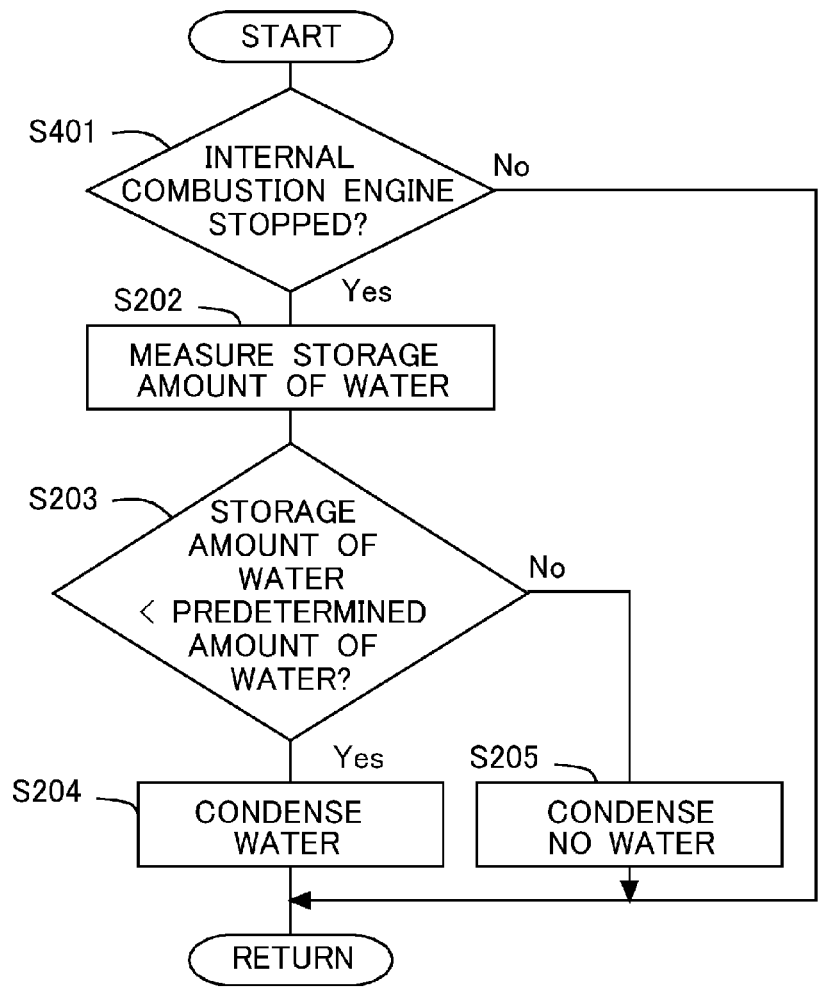

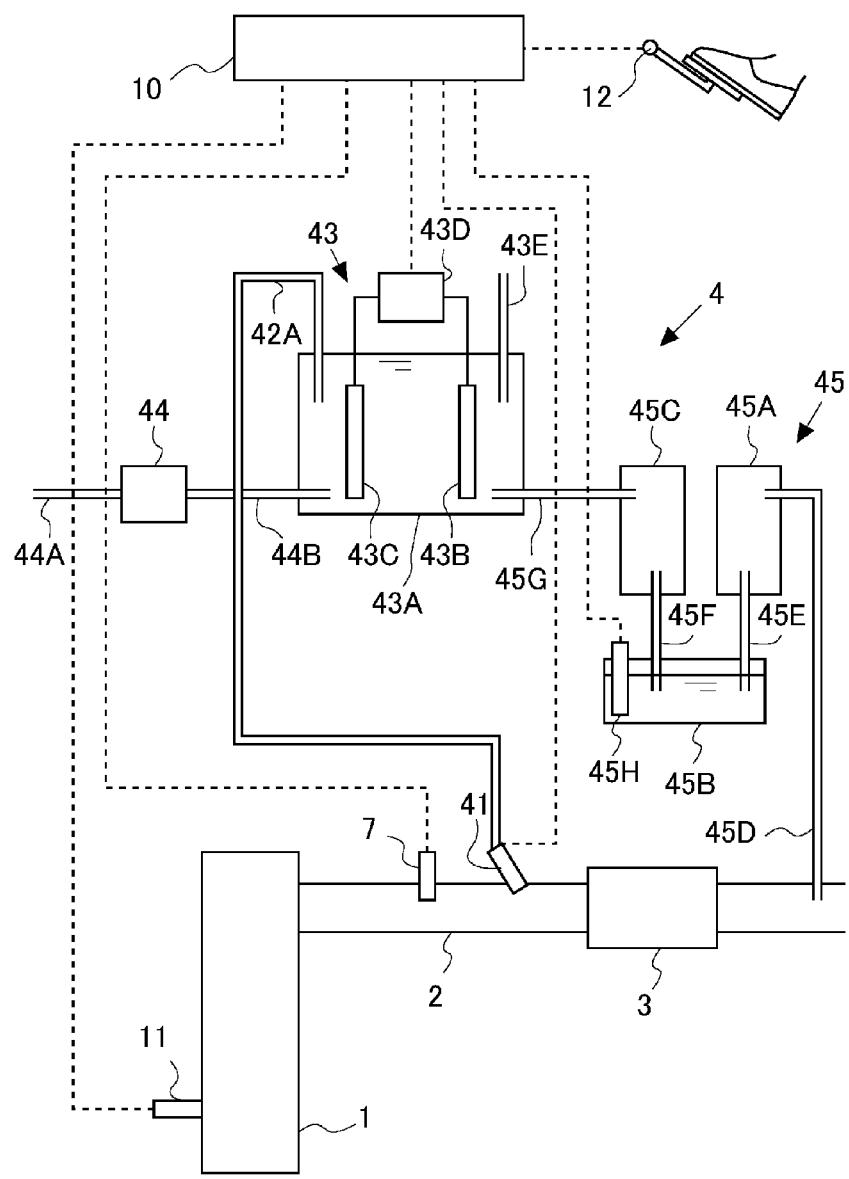
[Fig. 12]

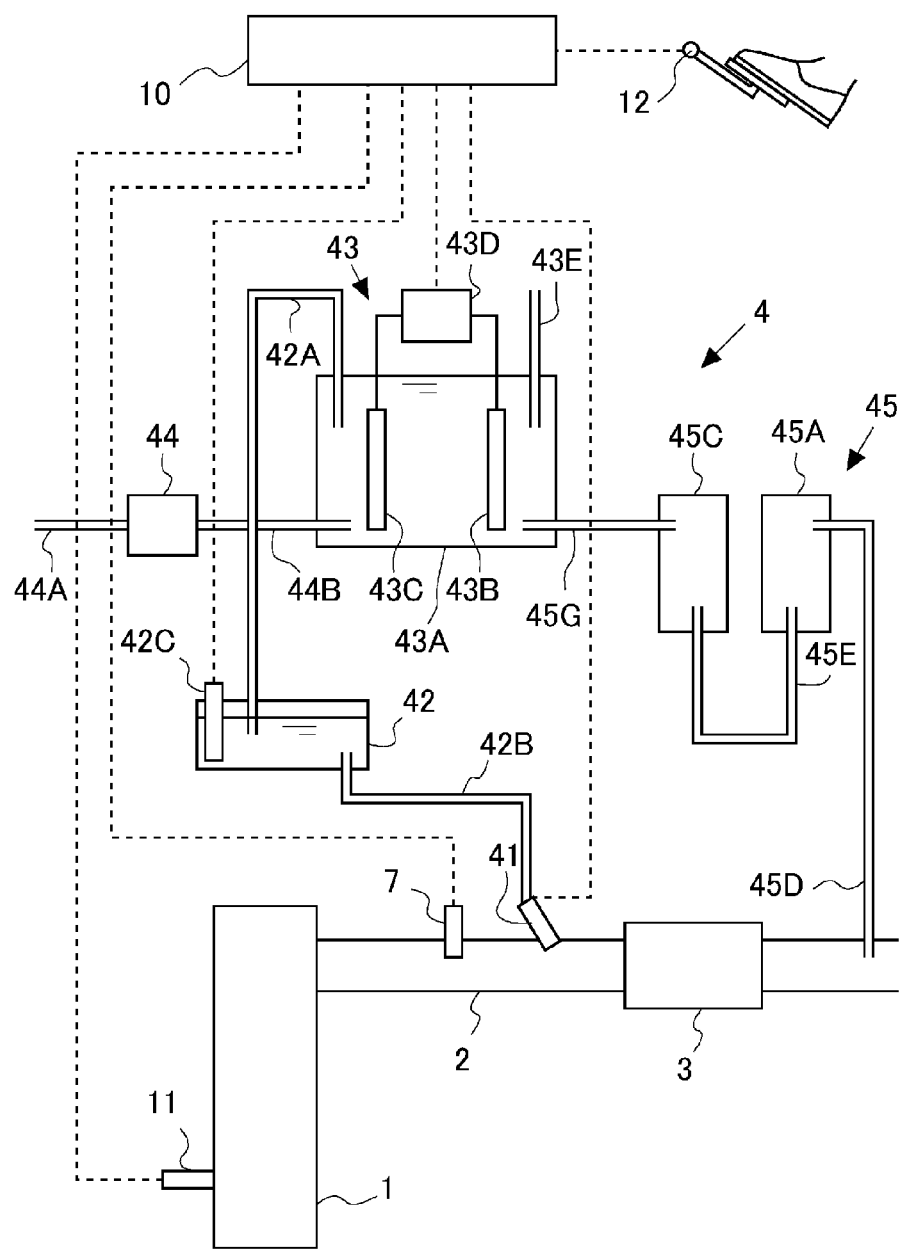
[Fig. 13]

EXHAUST GAS PURIFICATION APPARATUS FOR INTERNAL COMBUSTION ENGINE

CROSS-REFERENCE TO RELATED APPLICATIONS

This is a national phase application based on the PCT International Patent Application No. PCT/JP2014/004087 filed Aug. 5, 2014, claiming priority to Japanese Patent Application No. 2013-193926 filed Sep. 19, 2013, the entire contents of both of which are incorporated herein by reference.

TECHNICAL FIELD

The present invention relates to an exhaust gas purification apparatus for an internal combustion engine.

BACKGROUND ART

A selective catalytic reduction NOx catalyst (hereinafter simply referred to as "NOx catalyst" as well) is known, wherein NOx, which is contained in the exhaust gas discharged from an internal combustion engine, is purified by using ammonia as a reducing agent. For example, when NOx is purified by supplying ammonia previously stored in a tank to the NOx catalyst, it is necessary for a user to supplement ammonia to the tank.

In relation thereto, a technique is known, wherein ammonia is produced from water and nitrogen contained in the air (see, for example, Patent Document 1). When this technique is used, then it is unnecessary for the user to supplement ammonia, but it is necessary to supplement water in order to produce ammonia.

CITATION LIST

Patent Literature

[PTL 1]
JP2013-108480A;
[PTL 2]
JP2009-084615A;
[PTL 3]
JP2012-026036A;
[PTL 4]
JP2008-075646A;
[PTL 5]
JP2009-079540A.

SUMMARY OF INVENTION

Technical Problem

The present invention has been made taking the foregoing problems into consideration, an object of which is to improve the convenience of a user when NOx is purified by using ammonia.

Solution to Problem

In order to achieve the object described above, according to the present invention, there is provided an exhaust gas purification apparatus for an internal combustion engine, comprising:

a catalyst which is provided at an exhaust gas passage of the internal combustion engine and which purifies an exhaust gas of the internal combustion engine by using ammonia; and an ammonia supplier which supplies the ammonia to the catalyst, wherein the ammonia supplier includes:

an ammonia producer which produces the ammonia from nitrogen and water;

a nitrogen supplier which separates the nitrogen from air and which supplies the nitrogen to the ammonia producer; and a water supplier which separates the water from the exhaust gas of the internal combustion engine and which supplies the water to the ammonia producer.

It is appropriate that the catalyst purifies the exhaust gas by utilizing ammonia. The catalyst is, for example, a selective catalytic reduction NOx catalyst. The ammonia producer produces ammonia by using, as raw materials, the nitrogen which is separated from the air and the water which is separated from the exhaust gas of the internal combustion engine. The exhaust gas is purified by supplying the ammonia to the catalyst. The air and the exhaust gas of the internal combustion engine can be obtained without supplying them by a user for himself/herself. Therefore, it is possible to improve the convenience of the user.

The water supplier may separate the water from the exhaust gas of the internal combustion engine and the water supplier may supply the water in a state of water vapor to the ammonia producer; and the ammonia producer may electrolytically synthesize the ammonia.

According to the ammonia producer as described above, it is possible to electrolytically synthesize ammonia by using the nitrogen which is separated from the air and the water which is separated from the exhaust gas of the internal combustion engine. When the water is supplied in the state of water vapor to the ammonia producer, it is thereby possible to raise the production efficiency of ammonia as compared with when liquid water is supplied.

The ammonia producer may include:

a molten salt vessel which stores a molten salt; and a pair of electrodes which are provided in the molten salt vessel, wherein:

the nitrogen supplier may supply the nitrogen to the molten salt vessel;

the water supplier may supply the water to the molten salt vessel; and the ammonia producer may electrolytically synthesize the ammonia by applying electricity to the electrodes.

According to the ammonia producer as described above, it is possible to electrolytically synthesize ammonia by using the nitrogen which is separated from the air and the water which is separated from the exhaust gas of the internal combustion engine.

The water supplier can include:

a condenser which condenses the water contained in the exhaust gas of the internal combustion engine; and a vaporizer which converts the water condensed by the condenser into water vapor.

That is, the water vapor contained in the exhaust gas is condensed to liquefy the water, and the liquefied water is vaporized (evaporated) again to provide the water vapor (steam). The water vapor obtained as described above is supplied to the ammonia producer. In this procedure, when the water contained in the exhaust gas is once condensed and then vaporized, it is thereby possible to remove any impurity having been contained in the exhaust gas. Further, the water can be supplied in the state of water vapor to the ammonia producer, and hence it is possible to raise the production efficiency of ammonia. The condenser may condense the water by performing, for example, the heat exchange between the exhaust gas of the internal combustion engine and the cooling water of the internal combustion engine. Further, the water supplier may supply the water vapor to the ammonia producer when the temperature of the ammonia producer is not less than a predetermined temperature which is the temperature at which the warming-up is completed.

The water supplier can include a water tank which stores at least one of the water condensed by the condenser and the water obtained by recondensing (condensing again) the water vapor converted from the water by the vaporizer.

In this context, the water can be stored in a smaller volume in the state of liquid as compared with the state of gas, and hence it is possible to miniaturize the apparatus. Further, in general, it takes a certain extent of time to condense the water. For this reason, it is feared that the water vapor cannot be supplied to the ammonia producer until the water is condensed by the condenser. On the contrary, when the water is stored in the state of liquid, it is thereby unnecessary to wait until the water is condensed. Further, it is possible to suppress the shortage of the water to be supplied to the ammonia producer. Additionally, it is possible to distinctly control the supply of the water from the vaporizer to the ammonia producer and the condensation of the water by the condenser. Therefore, it is possible to improve the controllability (control performance). Further, the corrosivity of the liquid water is lower than that of the water vapor. Therefore, when the condensed water is stored without storing the water vapor, it is thereby possible to suppress any corrosion of the water tank.

The water supplier can condense the water by means of the condenser even when the ammonia is not produced by the ammonia producer, and the water condensed by the condenser can be stored in the water tank.

In this way, the water can be stored beforehand in a state of liquid before producing ammonia. Accordingly, it is possible to suppress the shortage of water when ammonia is produced. That is, it is possible to suppress any unsuccessful production of ammonia which would be otherwise caused by the delay of the condensation of water.

The water supplier can condense the water by means of the condenser even after the internal combustion engine stops, and the water condensed by the condenser can be stored in the water tank, if an amount of water stored in the water tank is less than a predetermined amount of water.

The exhaust gas allowed to come from the internal combustion engine exists in the exhaust gas passage even after the stop of the internal combustion engine. Therefore, the water can be condensed from the exhaust gas. The exhaust gas of the internal combustion engine can be supplied to the water supplier, for example, by utilizing a pump even after the stop of the internal combustion engine. Further, for example, the exhaust gas flows in some cases on account of the difference in temperature between the condenser and the exhaust gas passage. When water is stored in the water tank, it is thereby unnecessary to wait until the water is condensed after the startup of the internal combustion engine next time. Therefore, it is possible to promptly supply the water to the ammonia producer. Accordingly, it is possible to promptly produce ammonia after the startup of the internal combustion engine. In this way, the liquid water is continuously stored until the storage amount of water arrives at the predetermined amount of water. Thus, it is possible to suppress the shortage of liquid water when ammonia is produced next time.

The exhaust gas purification apparatus for the internal combustion engine may further comprise:

a controller which causes automatic stop of the internal combustion engine, wherein:

the controller can prohibit the automatic stop of the internal combustion engine if an amount of water stored in the water tank is less than a predetermined amount of water; and the water supplier can condense the water by means of the condenser if the amount of water stored in the water tank is less than the predetermined amount of water, and the water condensed by the condenser can be stored in the water tank.

When the automatic stop of the internal combustion engine is prohibited, it is thereby possible to generate the required electric power by the internal combustion engine if the electric power is required to store the water. Further, when the internal combustion engine is operated, the exhaust gas, which contains a large amount of water vapor, can be continuously supplied to the water supplier. Therefore, it is possible to facilitate the condensation of water. Further, when the water is previously stored in the water tank, it is thereby possible to supply the water from the water tank to the vaporizer even in such a state that it is difficult to condense the water by means of the water condenser. The controller may permit the automatic stop of the internal combustion engine, if the amount of water stored in the water tank arrives at the predetermined amount of water and the other automatic stop conditions are established. In this way, when the liquid water is continuously stored until the storage amount of water arrives at the predetermined amount of water, it is thereby possible to suppress the shortage of liquid water when ammonia is produced next time.

The predetermined amount of water can be an amount of water which makes it possible to produce ammonia by means of the ammonia producer so that ammonia is not in shortage when ammonia is supplied to the catalyst even when the water is not condensed by the condenser. Alternatively, the predetermined amount of water may be an amount of water which is required to produce ammonia when the internal combustion engine is started up next time. Further alternatively, the predetermined amount of water may be an amount of water which is required to produce ammonia by the ammonia producer during the period ranging from the startup of the internal combustion engine to the condensation of water. Further alternatively, the predetermined amount of water may be an amount of water which is required to produce ammonia by the ammonia producer until the condensation of water is completed by the condenser.

The exhaust gas purification apparatus for the internal combustion engine may further comprise:

a controller which causes automatic stop of the internal combustion engine, wherein:

the controller can prohibit the automatic stop of the internal combustion engine if the water is condensed by the condenser.

That is, the condensation of water may be preferentially performed as compared with the automatic stop of the internal combustion engine. Accordingly, the water can be condensed continuously, and hence it is possible to suppress the shortage of liquid water which is required to produce the water vapor. Further, it is possible to continuously produce ammonia. It is also allowable that the internal combustion engine is subjected to the automatic stop, if the condensed water arrives at the predetermined amount of water and the other automatic stop conditions are established.

The ammonia supplier can include an ammonia tank which stores the ammonia produced by the ammonia producer.

When the ammonia produced by the ammonia producer is stored beforehand, it is thereby possible to supply the previously stored ammonia to the catalyst even in such a state that it is difficult to produce ammonia by means of the ammonia producer. Accordingly, it is possible to suppress the shortage of the reducing agent in relation to the catalyst.

The ammonia producer can produce the ammonia and the produced ammonia can be stored in the ammonia tank, even after the internal combustion engine stops, if an amount of ammonia stored in the ammonia tank is less than a predetermined ammonia amount.

In this context, when the ammonia is previously stored in the ammonia tank, it is thereby possible to supply the ammonia from the ammonia tank to the catalyst even in such a state that it is difficult to produce ammonia by means of the ammonia producer. For example, the temperature of the ammonia producer is low immediately after the startup of the internal combustion engine, and hence the production efficiency of ammonia is low in some cases. On the contrary, the temperature of the ammonia producer is high immediately after the stop of the internal combustion engine, and hence the production efficiency of ammonia is high. Therefore, if ammonia is produced after the stop of the internal combustion engine, and the ammonia is stored beforehand, then the previously stored ammonia can be supplied to the catalyst even when the production efficiency of ammonia is low upon the startup of the internal combustion engine next time. In this way, when the production of ammonia is continued until the storage amount of ammonia arrives at the predetermined ammonia amount even after the stop of the internal combustion engine, it is thereby possible to suppress the shortage of ammonia when the internal combustion engine is started up next time.

The exhaust gas purification apparatus for the internal combustion engine may further comprise:

a controller which causes automatic stop of the internal combustion engine, wherein:

the controller can prohibit the automatic stop of the internal combustion engine if an amount of ammonia stored in the ammonia tank is less than a predetermined ammonia amount; and the ammonia producer can produce the ammonia and the produced ammonia can be stored in the ammonia tank, if the amount of ammonia stored in the ammonia tank is less than the predetermined ammonia amount.

When the automatic stop of the internal combustion engine is prohibited, it is thereby possible to generate the required electric power by means of the internal combustion engine if the electric power is required to produce ammonia. Further, when the automatic stop of the internal combustion engine is prohibited, for example, it is thereby possible to maintain the temperature of the ammonia supplier by utilizing the heat of the exhaust gas of the internal combustion engine. When ammonia is previously stored in the ammonia tank, it is thereby possible to supply ammonia from the ammonia tank to the catalyst even in such a state that it is difficult to produce ammonia by means of the ammonia producer. The controller may permit the automatic stop of the internal combustion engine if the amount of ammonia stored in the ammonia tank arrives at the predetermined ammonia amount and the other automatic stop conditions are established. In this way, when the production of ammonia is continued until the storage amount of ammonia arrives at the predetermined ammonia amount, it is thereby possible to suppress the shortage of ammonia to be supplied to the catalyst.

The predetermined ammonia amount can be an ammonia amount which makes it possible to purify the exhaust gas by means of the catalyst when it is difficult to produce ammonia. For example, it is also allowable that the predetermined ammonia amount is an ammonia amount to be supplied to the catalyst until the warming-up of the ammonia producer is completed.

The exhaust gas purification apparatus for the internal combustion engine may further comprise:

a controller which causes automatic stop of the internal combustion engine, wherein:

the controller can prohibit the automatic stop of the internal combustion engine if the ammonia is produced by the ammonia producer.

That is, the production of ammonia may be preferentially performed as compared with the automatic stop of the internal combustion engine. Accordingly, it is possible to continuously produce ammonia, and hence it is possible to suppress the shortage of ammonia to be supplied to the catalyst. The internal combustion engine may be subjected to the automatic stop if the amount of production of ammonia arrives at the predetermined ammonia amount, and the other automatic stop conditions are established.

The water supplier may include an exhaust gas intake passage which is a passage for intaking the exhaust gas from a portion of the exhaust gas passage disposed on a downstream side from the catalyst; and the water supplier can separate the water from the exhaust gas intake via the exhaust gas intake passage.

In this context, when the exhaust gas passes through the catalyst, the impurity contained in the exhaust gas is removed by the catalyst. Therefore, it is possible to suppress the inflow of the impurity into the water supplier. Accordingly, it is possible to settle the matter while removing the impurity to a small extent in relation to the water supplier. Further, it is possible to suppress the decrease in the production efficiency of ammonia which would be otherwise caused by the mixing of the impurity into the ammonia producer.

The water supplier can separate the water from the exhaust gas intake via the exhaust gas intake passage when NOx is purified by the catalyst.

The catalyst purifies NOx by using ammonia. Accordingly, it is possible to suppress the inflow of NOx into the water supplier. In this context, it is difficult to remove all of NOx during the process in which the water vapor is condensed and/or the water is vaporized again. For this reason, NOx, which flows into the water supplier, may also flows into the ammonia producer. It is feared that NOx may lower the production efficiency of ammonia in the ammonia producer. On the contrary, when the exhaust gas, for which NOx has been purified, is used, it is possible to suppress the inflow of NOx into the ammonia producer. Accordingly, it is possible to raise the production efficiency of ammonia. It is also allowable to consider that the phrase "when NOx is purified" is equivalent to the phrase "when ammonia is supplied to the catalyst". It is also allowable to consider that the phrase "when NOx is purified" is equivalent to the phrase "when an amount of ammonia sufficient to purify NOx is adsorbed by the catalyst". It is also allowable to consider that the phrase "when NOx is purified" is equivalent to the phrase "when the purification rate of NOx relevant to the catalyst is within an allowable range".

Advantageous Effects of Invention

According to the present invention, it is possible to purify NOx by using ammonia while improving the convenience of the user.

BRIEF DESCRIPTION OF DRAWINGS

FIG. 1 shows a schematic arrangement illustrating an exhaust gas purification apparatus for an internal combustion engine according to an embodiment.

FIG. 2 shows a flow chart illustrating a flow to produce ammonia after the completion of the warming-up of an ammonia producer.

FIG. 3 shows a flow chart illustrating a flow to condense water before the completion of the warming-up of the ammonia producer.

FIG. 4 shows a flow chart illustrating a flow to condense water when ammonia is supplied to a NOx catalyst.

FIG. 5 shows a flow chart illustrating a flow to produce ammonia even after the stop of the internal combustion engine.

FIG. 6 shows a flow chart illustrating a flow to produce ammonia while prohibiting the automatic stop of the internal combustion engine.

FIG. 7 shows a flow chart illustrating a flow to judge whether or not the automatic stop of the internal combustion engine is carried out.

FIG. 8 shows a flow chart illustrating a flow to produce ammonia while prohibiting the automatic stop of the internal combustion engine.

FIG. 9 shows a flow chart illustrating a flow to condense water while prohibiting the automatic stop of the internal combustion engine.

FIG. 10 shows a flow chart illustrating a flow to condense water while prohibiting the automatic stop of the internal combustion engine.

FIG. 11 shows a flow chart illustrating a flow to condense water even after the stop of the internal combustion engine.

FIG. 12 shows a schematic arrangement of an exhaust gas purification apparatus for an internal combustion engine when no ammonia tank is provided.

FIG. 13 shows a schematic arrangement of an exhaust gas purification apparatus for an internal combustion engine when no water tank is provided.

DESCRIPTION OF EMBODIMENTS

Modes for carrying out the present invention will be exemplarily explained in detail below on the basis of embodiments with reference to the drawings. However, for example, the dimension or size, the material, the shape, and the relative arrangement of each of constitutive parts or components described in the embodiments are not intended to limit the scope of the present invention only thereto unless specifically noted. Further, the embodiments described below can be also carried out in combination as far as possible.

Example 1

FIG. 1 shows a schematic arrangement illustrating an exhaust gas purification apparatus for an internal combustion engine according to an embodiment of the present invention. The internal combustion engine 1 is a diesel engine for driving a vehicle. However, the internal combustion engine 1 may be a gasoline engine. An exhaust gas passage 2 is connected to the internal combustion engine 1. A selective catalytic reduction NOx catalyst 3 (hereinafter referred to as "NOx catalyst 3"), which selectively reduces NOx contained in the exhaust gas by using ammonia as a reducing agent, is provided for the exhaust gas passage 2. The selective catalytic reduction NOx catalyst is provided in this embodiment. However, it is also allowable to provide any other catalyst provided that the catalyst purifies the exhaust gas of the internal combustion engine 1 by using ammonia. In this embodiment, the NOx catalyst 3 corresponds to the catalyst of the present invention.

An ammonia supplier 4 is provided for the exhaust gas passage 2. The ammonia supplier 4 supplies ammonia to the NOx catalyst 3 by supplying ammonia to a portion of the exhaust gas passage 2 disposed upstream from the NOx catalyst 3. The ammonia supplier 4 is constructed to include an injection valve 41 for injecting ammonia into the exhaust gas, an ammonia tank 42 for storing ammonia, an ammonia producer 43 for producing ammonia, a nitrogen supplier 44 for supplying nitrogen to the ammonia producer 43, and a water supplier 45 for supplying water vapor (steam) to the ammonia producer 43. In this embodiment, the ammonia tank 42 corresponds to the ammonia tank of the present invention.

The nitrogen supplier 44 is the device for separating the nitrogen from the air. The nitrogen supplier 44 is provided with, for example, a compressor for compressing the air and a nitrogen enriching film. An air passage 44A, which is the passage for intaking the air, has one end which is connected to the nitrogen supplier 44. The other end of the air passage 44A is communicated with the atmospheric air. A nitrogen passage 44B, which is provided as the passage for supplying the nitrogen separated by the nitrogen supplier 44 to the ammonia producer 43, has one end which is connected to the nitrogen supplier 44. The other end of the nitrogen passage 44B is connected to the ammonia producer 43. The nitrogen supplier 44 may separate the nitrogen from the air by means of any other known device. Further, the nitrogen supplier 44 may release the remaining gas obtained after the separation of nitrogen to the atmospheric air.

The water supplier 45 is provided with a condenser 45A for condensing the water contained in the exhaust gas, a water tank 45B for storing the condensed liquid water, and a vaporizer (evaporator) 45C for vaporizing the condensed water again to provide the water vapor. An exhaust gas intake passage 45D, which is the passage for intaking the exhaust gas of the internal combustion engine 1, has one end which is connected to the condenser 45A. The other end of the exhaust gas intake passage 45D is connected to a portion of the exhaust gas passage 2 disposed downstream from the NOx catalyst 3. Further, a first condensed water passage 45E, which is the passage for discharging the condensed water to the water tank 45B, has one end which is connected to a bottom portion of the condenser 45A. The other end of the first condensed water passage 45E is connected to the water tank 45B.

A second condensed water passage 45F, which is the passage for incorporating the liquid water from the water tank 45B, has one end which connected to the vaporizer 45C. The other end of the second condensed water passage 45F is connected to the water tank 45B. A water vapor passage 45G, which is the passage for supplying the water vapor to the ammonia producer 43, has one end which is connected to the vaporizer 45C. The other end of the water vapor passage 45G is connected to the ammonia producer 43. The vaporizer 45C heats the liquid water by using, for example, a heater to produce the water vapor. The vaporizer 45C may produce the water vapor by lowering the pressure of the liquid water.

Further, the condenser 45A is provided with, for example, a heat exchanger which performs the heat exchange between the exhaust gas and a heating medium having a temperature lower than the temperature of the exhaust gas, and the condenser 45A condenses the water contained in the exhaust gas by lowering the temperature of the exhaust gas by means of the heat exchanger. Those utilizable as the heating medium include, for example, the cooling water of the internal combustion engine 1, the lubricating oil of the internal combustion engine 1, and the air. For example, the temperature of the cooling water of the internal combustion engine 1 is maintained between 80 degrees C. and 90 degrees C. When the water is condensed by using the cooling water, the temperature of the condensed water becomes a temperature near to 80 degrees C. to 90 degrees C. Therefore, it is easy to vaporize the water by the vaporizer 45C. Accordingly, it is possible to reduce the energy required for the vaporization of the water. Further, it is also possible to condense the water by compressing the exhaust gas.

In this embodiment, the condenser 45A corresponds to the condenser of the present invention. Further, in this embodiment, the vaporizer 45C corresponds to the vaporizer of the present invention.

The water tank 45B is the tank for storing the water in the state of liquid beforehand. The water tank 45B is provided with a water amount sensor 45H for measuring the amount of stored water. It is also possible to estimate the amount of water stored in the water tank 45B. The water tank 45B may store the water recondensed (condensed again) after being vaporized (evaporated) by the vaporizer 45C. In this embodiment, the water tank 45B corresponds to the water tank of the present invention.

The ammonia producer 43 is provided with a vessel 43A for storing a molten salt, an anode 43B, a cathode 43C, and a power source 43D. The anode 43B is provided in the vicinity of the other end of the water vapor passage 45G. Further, the cathode 43C is provided in the vicinity of the other end of the nitrogen passage 44B. Any molten salt is usable provided that $N^{3-}$ can exist stably, for which it is possible to exemplify, for example, at least one of alkali metal halide and alkaline earth metal halide. In this embodiment, the vessel 43A corresponds to the molten salt vessel of the present invention. Further, in this embodiment, the anode 43B and the cathode 43C correspond to the pair of electrodes of the present invention.

The alkali metal halide is exemplified, for example, by LiF, NaF, KF, RbF, CsF, LiCl, NaCl, KCl, RbCl, CsCl, LiBr, NaBr, KBr, RbBr, CsBr, LiI, NaI, KI, RbI, and CsI. The alkaline earth metal halide is exemplified, for example, by $MgF_2$, $CaF_2$, $SrF_2$, $BaF_2$, $MgCl_2$, $CaCl_2$, $SrCl_2$, $BaCl_2$, $MgBr_2$, $CaBr_2$, $SrBr_2$, $BaBr_2$, $MgI_2$, $CaI_2$, $SrI_2$, and $BaI_2$. The compounds as described above can be used singly or in combination of two or more. The combination and the mixing ratio of the compounds are not limited, which can be appropriately set depending on, for example, the desired operation temperature of the molten salt.

The temperature of the molten salt is not limited. However, ammonia is easily decomposed into the nitrogen gas and the hydrogen gas in a high temperature region. Therefore, the temperature of the molten salt is preferably 200 to 450 degrees C. and more preferably 250 to 400 degrees C. in view of the suppression of the decomposition of ammonia. The molten salt can be heated, for example, by using a heater. Alternatively, the molten salt may be heated by using the heat of the exhaust gas. For example, it is also appropriate to provide a heat exchanger for performing the heat exchange between the exhaust gas and the molten salt.

An electrode, which oxidizes $O^{2-}$ produced by the reaction of water vapor to produce the oxygen gas, is used as the anode 43B. An electrode material, which is commercially available as an insoluble anode or an oxygen-producing anode, can be used as the anode 43B. The anode reaction is as follows.

$$2O^{2-} \rightarrow O_2 + 4e^-$$ [Math. 1]

The anode reaction described above is the main reaction. Other than the above, it is considered the reaction in which $OH^-$ produced by the equilibrium reaction of $H_2O$ in the molten salt is oxidized to produce the oxygen gas and the reaction in which the oxygen gas is produced from $H_2O$ remaining in the molten salt in spite of an extremely slight amount are also caused. For this reason, an oxygen passage 43E, which is the passage for releasing the oxygen gas to the outside, has one end which is connected to the vessel 34A. The other end of the oxygen passage 43E is communicated with the atmospheric air.

On the other hand, a cathode, which reduces the nitrogen gas to supply $N^{3-}$ to the molten salt, is used as the cathode 43C. As for the material of the cathode 43C, it is appropriate to use a metal or an alloy capable of reducing the nitrogen gas. The cathode reaction is as follow.

$$N^2 + 6e^- \rightarrow 2N^{3-}$$ [Math. 2]

Then, the following reaction occurs in the molten salt.

$$2N^{3-} + 3H_2O \rightarrow NH_3 + 3O^{2-}$$ [Math. 3]

In accordance with the reactions described above, the following reaction occurs, and ammonia is electrolytically synthesized by the ammonia producer 43.

$$N_2 + 3H_2O \rightarrow 2NH_3 + 3/2O_2$$ [Math. 4]

A first ammonia passage 42A, which is the passage for discharging produced ammonia to the ammonia tank 42, has one end which is connected to the vessel 43A. The other end of the first ammonia passage 42A is connected to the ammonia tank 42.

A second ammonia passage 42B, which is the passage for supplying ammonia to the injection valve 41, has one end which is connected to the ammonia tank 42. The other end of the second ammonia passage 42B is connected to the injection valve 41. An ammonia amount sensor 42C, which measures the amount of stored ammonia, is provided for the ammonia tank 42. The injection valve 41 is provided at a portion of the exhaust gas passage 2 disposed upstream from the NOx catalyst 3. Ammonia, which is injected from the injection valve 41, is utilized as the reducing agent in the NOx catalyst 3.

A pump may be provided so that the fluid flows through the respective passages of the exhaust gas intake passage 45D, the first condensed water passage 45E, the second condensed water passage 45F, the water vapor passage 45G, the first ammonia passage 42A, and the second ammonia passage 42B. The passages may be provided with valves for opening/closing the passages.

For example, the exhaust gas intake passage 45D may be provided with a pump for discharging the gas from the exhaust gas passage 2 toward the condenser 45A. When the pump is used, it is thereby possible to supply the exhaust gas of the internal combustion engine 1 to the condenser 45A when the pressure of the exhaust gas is relative low or even when the internal combustion engine 1 is stopped. However, the temperature of the condenser 45A is set to be lower than the temperature of the exhaust gas in order to condense the water contained in the exhaust gas. Therefore, when the temperature difference is utilized, it is possible to intake or incorporate the exhaust gas into the condenser 45A even when the pump is not provided.

The exhaust gas intake passage 45D may be provided with a valve for opening/closing the exhaust gas intake passage 45D. For example, when it is unnecessary to condense water, the valve is closed to shut off the flow of the gas. Accordingly, it is possible to suppress the storage of any unnecessary amount of water in the water tank 45B.

The supply of the water from the condenser 45A to the water tank 45B may be performed by utilizing a pump. However, it is also allowable to utilize the gravity. For example, when the condenser 45A is provided beforehand at a higher position as compared with the water tank 45B, the water, which is condensed by the condenser 45A and which thereafter flows downwardly in accordance with the action of the gravity, flows to the water tank 45B. Further, when a pump is provided beforehand at a bottom portion of the condenser 45A or the first condensed water passage 45E, it is also possible to supply the water from the condenser 45A to the water tank 45B. It is also appropriate to provide a valve which shuts off the flow of the water through the first condensed water passage 45E.

Similarly, the supply of the water from the water tank 45B to the vaporizer 45C may be performed by utilizing a pump. Alternatively, it is also allowable to utilize the gravity. Further, it is also appropriate to provide a valve which shuts off the flow of the water through the second condensed water passage 45F. Further, it is also appropriate to provide, for the water vapor passage 45G, a pump which discharges the water vapor from the vaporizer 45C toward the vessel 43A. However, when the volume is increased in accordance with the vaporization of the water in the vaporizer 45C, the water vapor flows from the vaporizer 45C to the vessel 43A even when the pump is not provided. Further, it is also appropriate to provide a valve which shuts off the flow of the water vapor through the water vapor passage 45G.

Further, a pump, which discharges ammonia from the vessel 43A toward the ammonia tank 42, may be provided for the vessel 43A or the first ammonia passage 42A. However, the pressure is raised in the vessel 43A in accordance with the supply of the nitrogen and the water vapor. Therefore, it is also possible to allow ammonia to flow by utilizing the pressure. Further, it is also appropriate to provide a valve which shuts off the flow of ammonia through the first ammonia passage 42A. A pump, which discharges ammonia from the ammonia tank 42 toward the injection valve 41, may be provided for the ammonia tank 42 or the second ammonia passage 42B. Also in this case, it is also appropriate to allow ammonia to flow by utilizing the increase in the pressure in the ammonia tank 42. Further, it is also appropriate to provide a valve which shuts off the flow of ammonia through the second ammonia passage 42B.

It is also appropriate to provide a valve which shuts off the flow of the air through the air passage 44A. Further, it is also appropriate to provide a valve which shuts off the flow of the nitrogen through the nitrogen passage 44B.

A NOx sensor 7, which detects NOx contained in the exhaust gas allowed to flow into the NOx catalyst 3, is provided at a portion of the exhaust gas passage 2 disposed upstream from the NOx catalyst 3. It is also possible to say that the NOx sensor 7 detects NOx discharged from the internal combustion engine 1.

ECU 10, which is the electronic controller, is provided in combination with the internal combustion engine 1. ECU 10 controls, for example, the operation state of the internal combustion engine 1 and the exhaust gas purification apparatus. The water amount sensor 45H, the ammonia amount sensor 42C, and the NOx sensor 7 described above as well as a crank position sensor 11 and an accelerator opening degree sensor 12 are electrically connected to ECU 10, and the output values of the respective sensors are transmitted to ECU 10.

Therefore, ECU 10 can grasp the operation state of the internal combustion engine 1 including, for example, the number of revolutions of the engine based on the detection performed by the crank position sensor 11 and the engine load based on the detection performed by the accelerator opening degree sensor 12. In this embodiment, NOx contained in the exhaust gas, which flows into the NOx catalyst 3, can be detected by the NOx sensor 7. However, NOx, which is contained in the exhaust gas discharged from the internal combustion engine 1 (that is the exhaust gas before being purified by the NOx catalyst 3, i.e., the exhaust gas allowed to flow into the NOx catalyst 3), is relevant to the operation state of the internal combustion engine. Therefore, it is also possible to make the estimation on the basis of the operation state of the internal combustion engine 1.

Further, ECU 10 controls the ammonia producer 43, the nitrogen supplier 44, and the water supplier 45. The injection valve 41 and the power source 43D are electrically connected to ECU 10, and ECU 10 operates these devices. When the pumps or the valves are provided as described above, the pumps or valves are controlled by ECU 10.

Then, ECU 10 makes the instruction to the injection valve 41 in accordance with the detected or estimated NOx concentration in the exhaust gas (which may be the NOx amount as well), and ammonia, which is in an amount required to reduce NOx, is supplied into the exhaust gas.

Further, ECU 10 allows the ammonia supplier 4 to produce ammonia. At first, the exhaust gas flowing through the exhaust gas passage 2 is incorporated into the condenser 45A via the exhaust gas intake passage 45D. In the condenser 45A, the water contained in the exhaust gas is condensed into the liquid. The water, which has been converted into the liquid, flows through the first condensed water passage 45E, and the water is once stored in the water tank 45B. The liquid water contained in the water tank 45B is incorporated into the vaporizer 45C via the second condensed water passage 45F. In the vaporizer 45C, the liquid water is vaporized again. Then, the water vapor passes through the water vapor passage 45G, and the water vapor flows into the portion in the vicinity of the anode 43B in the vessel 43A.

Further, the air is incorporated into the nitrogen supplier 44 via the air passage 44A. In the nitrogen supplier 44, when the air is allowed to pass through the hollow fiber based on the use of the nitrogen enriching film, then the oxygen passes through the nitrogen enriching film, and the oxygen is released to the outside. Therefore, the concentration of nitrogen in the hollow fiber is raised, and hence it is possible to obtain a nitrogen-enriched gas. The nitrogen flows through the nitrogen passage 44B, and the nitrogen flows into the portion in the vicinity of the cathode 43C in the vessel.

When ECU 10 operates the power source 43D to apply the voltage between the anode 43B and the cathode 43C, ammonia is electrolytically synthesized. Ammonia, which is produced as described above, flows through the first ammonia passage 42A, and ammonia is once stored in the ammonia tank 42. Ammonia, which is contained in the ammonia tank 42, flows through the second ammonia passage 42B to arrive at the injection valve 41. When ECU 10 opens the injection valve 41, ammonia is supplied into the exhaust gas passage 2. Ammonia flows into the NOx catalyst 3 together with the exhaust gas, and ammonia is adsorbed by the NOx catalyst 3. When NOx flows into the NOx catalyst 3, NOx is reduced by ammonia having been adsorbed by the NOx catalyst 3.

As explained above, in the ammonia supplier 4 according to this embodiment, the water, which is to be used for producing ammonia, is obtained from the exhaust gas of the internal combustion engine 1. Therefore, it is unnecessary for the user to supply the water. Further, the nitrogen, which is to be used for producing ammonia, is obtained from the air. Therefore, it is unnecessary for the user to supply the nitrogen. Therefore, the convenience is improved for the user. Further, it is possible to remove the impurity contained in the exhaust gas during the process in which the water contained in the exhaust gas is condensed by the condenser 45A and then the water is vaporized by the vaporizer 45C. Accordingly, it is possible to suppress the inflow of the impurity into the molten salt. Therefore, it is possible to suppress the decrease in the ammonia production efficiency. In this embodiment, the water is supplied in the state of the water vapor from the water supplier 45 to the ammonia producer 43. However, it is also possible to produce ammonia by supplying the liquid water. However, in the case of the electrolytic synthesis, the reactant (reacting matter) is brought in contact with the electrode. However, upon the contact, the better efficiency is obtained with the gas as compared with the liquid. Therefore, when the water vapor is supplied to the ammonia producer 43, it is possible to further raise the production efficiency of ammonia as compared with when the liquid water is supplied.

In this embodiment, the exhaust gas intake passage 45D is connected to the portion of the exhaust gas passage 2 disposed downstream from the NOx catalyst 3. However, in place thereof, the exhaust gas intake passage 45D may be connected to a portion of the exhaust gas passage 2 disposed upstream from the NOx catalyst 3.

In this embodiment, the water supplier 45 condenses the water contained in the exhaust gas, and the liquid water is further vaporized to supply the water vapor to the ammonia producer 43. However, on condition that the water vapor can be supplied to the ammonia producer 43, it is also appropriate that the water vapor is separated from the exhaust gas by means of any other method to supply the water vapor to the ammonia producer 43. For example, it is also appropriate to use a film which makes it possible to directly separate the water vapor from the exhaust gas. In this case, it is unnecessary to condense the water.

Example 2

In this embodiment, the water vapor is supplied to the ammonia producer 43 after the completion of the warming-up of the ammonia producer 43. The other devices or the like are the same as those of the first embodiment, any explanation of which will be omitted.

In the ammonia producer 43, the warming-up is completed when the temperature of the molten salt is, for example, 200 degrees C. to 250 degrees C., provided that the completion depends on the type of the molten salt. For example, when the internal combustion engine 1 is started up, then the temperature of the molten salt is low, and it takes a certain period of time to raise the temperature of the molten salt. Therefore, even when the nitrogen and the water vapor are supplied to the ammonia producer 43, ammonia is scarcely produced.

In view of the above, in this embodiment, the production of ammonia is started after the completion of the warming-up of the ammonia producer 43. Therefore, the water vapor is supplied from the water supplier 45 to the ammonia producer 43 after the completion of the warming-up of the ammonia producer 43. When ammonia is stored beforehand in the ammonia tank 43, ammonia contained in the ammonia tank 42 can be supplied to the NOx catalyst 3 even before the completion of the warming-up of the ammonia producer 43. Accordingly, it is possible to shorten the period in which NOx is not purified.

FIG. 2 shows a flow chart illustrating a flow to produce ammonia after the completion of the warming-up of the ammonia producer 43. This routine is executed by ECU 10 every time when a predetermined time elapses.

In Step S101, it is judged whether or not the warming-up of the ammonia producer 43 is completed. For example, it is judged whether or not the temperature of the molten salt arrives at a predetermined temperature (for example, 200 degrees C. to 250 degrees C.). In this case, it is also allowable to provide a temperature sensor for measuring the temperature of the molten salt. Alternatively, it is also allowable to estimate the temperature of the molten salt on the basis of the heating time of the molten salt. Further alternatively, it is also allowable to judge that the warming-up of the ammonia producer 43 is completed if the heating time of the molten salt arrives at a predetermined time. If the affirmative judgment is made in Step S101, the routine proceeds to Step S102. On the other hand, if the negative judgment is made, the routine proceeds to Step S103.

In Step S102, the water vapor is supplied from the water supplier 45 to the ammonia producer 43. In synchronization therewith, the nitrogen is supplied from the nitrogen supplier 44 to the ammonia producer 43. Further, ECU 10 operates the power source to apply the voltage to the anode 43B and the cathode 43C. Accordingly, ammonia is produced by the ammonia producer 43. In Step S102, if it is unnecessary to produce ammonia by the ammonia producer 43, it is also allowable that the water vapor is not supplied to the ammonia producer 43. For example, when a sufficient amount of ammonia is stored in the ammonia tank 42, it is unnecessary to produce ammonia. Therefore, it is also allowable that the water vapor is not supplied to the ammonia producer 43. The water vapor may be supplied to the ammonia producer 43 after waiting for the establishment of the other conditions to produce ammonia.

On the other hand, in Step S103, the water vapor is not supplied from the water supplier 45 to the ammonia producer 43. In this case, it is also allowable to stop the flow of the water in the water supplier 45. Further, it is also allowable to stop the vaporization of the water in the vaporizer 45C. It is also allowable that the nitrogen is not supplied from the nitrogen supplier 44 to the ammonia producer 43 in synchronization with no supply of the water vapor. Further, it is also allowable that the voltage is not applied to the anode 43B and the cathode 43C.

In this way, it is possible to suppress the vaporization of the water in the water supplier 45 before the completion of the warming-up of the ammonia producer 43. Therefore, it is possible to reduce the energy required to vaporize the water, and hence it is possible to improve, for example, the fuel efficiency (fuel consumption). Further, it is possible to suppress the decrease in the water in the water tank 45B. Therefore, the water can be immediately vaporized by the vaporizer 45C after the completion of the warming-up of the ammonia producer 43, and it is possible to supply the water vapor to the ammonia producer 43.

Example 3

In this embodiment, the water is condensed by the condenser 45A, and the condensed water is stored in the water tank 45B, even before the completion of the warming-up of the ammonia producer 43. The other devices or the like are the same as those of the first embodiment, any explanation of which will be omitted.

As shown in FIG. 1, when a water tank 45B is provided, even if any ammonia is not produced by the ammonia producer 43, then it is possible to store the liquid water. Therefore, it is possible to store the condensed water beforehand, even before the completion of the warming-up of the ammonia producer 43.

In this context, a it takes a certain extent of time to condense the water in the condenser 45A. Therefore, even if the condensation of the water is started by the condenser 45A immediately after the completion of the warming-up of the ammonia producer 43, it is necessary to wait for the production of the water vapor until the water is condensed. That is, even when the warming-up of the ammonia producer 43 is completed, it is impossible to immediately produce ammonia. Therefore, it is feared that ammonia, which is to be supplied to the NOx catalyst 3, may be in shortage.

On the contrary, when the water is condensed beforehand before the completion of the warming-up of the ammonia producer 43, it is possible to promptly supply the liquid water to the vaporizer 45C. That is, it is possible to produce the water vapor by using the water having been condensed in advance, without waiting for the condensation of the water in the condenser 45A. For this reason, it is possible to promptly start the production of ammonia.

When the water is stored beforehand in the water tank 45B, it is possible to independently carry out the vaporization of the water by the vaporizer 45C and the condensation of the water by the condenser 45A respectively. Therefore, the controllability is improved. Further, when the water is stored in the state of liquid not in the state of gas, it is thereby enough to use a small volume required to store the water. Accordingly, it is possible to miniaturize the apparatus. Further, the corrosivity of the liquid water is lower than that of the water vapor. Therefore, it is possible to prolong the service life of the water tank 45B.

FIG. 3 shows a flow chart illustrating a flow to condense the water before the completion of the warming-up of the ammonia producer 43. This routine is executed by ECU 10 every time when a predetermined time elapses.

In Step S201, it is judged whether or not it is before the completion of the warming-up of the ammonia producer 43. In this step, it is judged whether or not the state is given before the completion of the warming-up of the ammonia producer 43 in the same manner as in Step S101. For example, it is judged whether or not the temperature of the molten salt is less than a predetermined temperature (for example, 200 degrees C. to 250 degrees C.). If the affirmative judgment is made in Step S201, the routine proceeds to Step S202. On the other hand, if the negative judgment is made in Step S201, this routine is completed.

In Step S202, the storage amount of water in the water tank 45B is measured. The measurement is performed by the water amount sensor 45H.

In Step S203, it is judged whether or not the storage amount of water measured in Step S202 is less than a predetermined amount of water. In this step, it is judged whether or not an amount of liquid water, which is sufficient to produce ammonia, is stored in the water tank 45B. The predetermined amount of water is such an amount of liquid water that the production of ammonia can be immediately performed after the completion of the warming-up of the ammonia producer 43. The predetermined amount of water is previously determined, for example, by an experiment or simulation.

If the affirmative judgment is made in Step S203, the routine proceeds to Step S204. On the other hand, if the negative judgment is made, the routine proceeds to Step S205.

In Step S204, the water is condensed by the condenser 45A. For example, in order to condense the water by the condenser 45A, the exhaust gas is allowed to flow through the exhaust gas intake passage 45D. Further, the heating medium, which performs the heat exchange with the exhaust gas, is allowed to flow through the condenser 45A. The condensation of the water is completed when the amount of water stored in the water tank 45B is not less than the predetermined amount of water. In this procedure, in Step S204, the condensation of the water may be started immediately. However, the water may be condensed after waiting for the establishment of the other conditions to condense water. If a sufficient amount of ammonia is stored in the ammonia tank 42, and it is unnecessary to immediately produce ammonia, then it is also allowable that the water is not condensed. The water, which is condensed in this step, is stored in the water tank 45B beforehand.

On the other hand, in Step S205, the water is not condensed by the condenser 45A. For example, the exhaust gas is not allowed to flow through the exhaust gas intake passage 45D. Further, the heating medium, which performs the heat exchange with the exhaust gas, is not allowed to flow through the condenser 45A. In Step S205, it is assumed that the water is not condensed because the sufficient amount of water is stored in the water tank 45B. However, in place thereof, it is also allowable that the water is condensed until arrival at the capacity or volume of the water tank 45B.

In this procedure, for example, ammonia is supplied in some cases to the NOx catalyst 3 before the completion of the warming-up of the ammonia producer 43. In this situation, ammonia contained in the ammonia tank 42 is consumed. Therefore, it is sometimes necessary to immediately produce a large amount of ammonia in order to supplement ammonia to the ammonia tank 42 after the completion of the warming-up of the ammonia producer 43. Even in such a situation, when the liquid water is stored beforehand in the water tank 45B, it is possible to suppress the shortage of the water upon the production of ammonia. Then, it is possible to promptly produce ammonia by the ammonia producer 43.

Example 4

In this embodiment, the water is condensed from the exhaust gas intaken via the exhaust gas intake passage 45D when the purification of NOx is performed by the NOx catalyst 3. The other devices or the like are the same as those of the first embodiment, any explanation of which will be omitted.

The exhaust gas intake passage 45D is connected to the portion of the exhaust gas passage 2 disposed downstream from the NOx catalyst 3. Therefore, it is possible to suppress the inflow of NOx into the water supplier 45 by intaking the exhaust gas when the purification of NOx is performed by the NOx catalyst 3. In this context, it is difficult to completely remove NOx during the process in which the water vapor is condensed and/or the water is vaporized again. For this reason, NOx, which flows into the water supplier 45, may also flow into the ammonia producer 43. It is feared that NOx may lower the production efficiency of ammonia in the ammonia producer 43. On the contrary, when the exhaust gas after the purification of NOx is used, it is possible to suppress the inflow of NOx into the ammonia producer 43. Accordingly, it is possible to raise the production efficiency of ammonia.

It is also allowable to consider that the phrase "when NOx is purified" is equivalent to the phrase "when ammonia is supplied to the NOx catalyst 3". It is also allowable to consider that the phrase "when NOx is purified" is equivalent to the phrase "when an amount of ammonia sufficient to purify NOx is adsorbed by the NOx catalyst 3". It is also allowable to consider that the phrase "when NOx is purified" is equivalent to the phrase "when the purification rate of NOx relevant to the NOx catalyst 3 is within an allowable range".

FIG. 4 shows a flow chart illustrating a flow to condense water when ammonia is supplied to the NOx catalyst 3. This routine is executed by ECU 10 every time when a predetermined time elapses. The steps, in which the same processes as those of the flow described above are performed, are designated by the same reference numerals, any explanation of which will be omitted.

In Step S301, it is judged whether or not ammonia is being supplied to NOx catalyst 3. In this step, it is judged whether or not the purification of NOx is performed by the NOx catalyst 3. It is judged that ammonia is being supplied to the NOx catalyst 3, for example, when ammonia is injected from the injection valve 41. Alternatively, it is judged that ammonia is being supplied to the NOx catalyst 3 when ammonia, which is injected from the injection valve 41, arrives at the NOx catalyst 3. It is also allowable to judge whether or not the purification rate of NOx of the NOx catalyst 3 is not less than a threshold value which is the lower limit value of the allowable range, in place of the judgment to judge whether or not ammonia is being supplied to the NOx catalyst 3. Alternatively, it is also allowable to judge whether or not ammonia, which is adsorbed by the NOx catalyst 3, is not less than a predetermined amount, in place of the judgment to judge whether or not ammonia is being supplied to the NOx catalyst 3. The predetermined amount is the amount of adsorption of ammonia at which the NOx purification rate is the lower limit value of the allowable range. Further alternatively, in this step, it is also allowable to judge whether or not the NOx catalyst 3 is activated, in place of the judgment to judge whether or not ammonia is being supplied to the NOx catalyst 3. If the NOx catalyst 3 is activated, ECU 10 allows the injection valve 41 to inject ammonia therefrom. Therefore, it is approved that ammonia is supplied to the NOx catalyst 3.

If the affirmative judgment is made in Step S301, the routine proceeds to Step S204. On the other hand, if the negative judgment is made, the routine proceeds to Step S205. In this procedure, in Step S204, it is also allowable that the condensation of the water is started immediately. However, it is also allowable to condense the water after waiting for the establishment of the other conditions to condense the water. If a sufficient amount of ammonia is stored in the ammonia tank 42, and it is unnecessary to immediately produce ammonia, then it is also allowable that the water is not condensed.

As described above, when ammonia is supplied to the NOx catalyst 3, NOx is purified by the NOx catalyst 3. Therefore, the NOx concentration is low in the exhaust gas at the positions disposed downstream from the NOx catalyst 3. Therefore, the water condensed by the condenser 45A can be suppressed from being mixed with NOx.

In this embodiment, it is also possible to provide, for example, an oxidation catalyst, a three way catalyst, a particulate filter, or an ammonia slip catalyst, other than or in addition to the NOx catalyst 3. The particulate filter collects the particulate matter (PM) contained in the exhaust gas. Further, the ammonia slip catalyst is provided at a portion of the exhaust gas passage 2 disposed downstream from the NOx catalyst 3, and the ammonia slip catalyst oxidizes ammonia allowed to flow out from the NOx catalyst 3. When the exhaust gas intake passage 45D is connected at a portion of the exhaust gas passage 2 disposed on the downstream side from the catalyst and/or the filter as described above, it is thereby possible to suppress any other substance (HC, CO, PM, or ammonia) from being mixed in the water condensed by the condenser 45A.

Example 5

In this embodiment, ammonia is produced until the amount of ammonia contained in the ammonia tank 42 is not less than a predetermined ammonia amount, even after the stop of the internal combustion engine 1. The other devices or the like are the same as those of the first embodiment, any explanation of which will be omitted.

In this case, when ammonia is previously stored in the ammonia tank 42, it is thereby possible to supply ammonia to the NOx catalyst 3 from the ammonia tank 42, even in a state in which it is difficult to produce ammonia by the ammonia producer 43. For example, the temperature of the ammonia producer 43 is low immediately after the startup of the internal combustion engine 1, and hence the production efficiency of ammonia is low in some cases. On the contrary, the temperature of the ammonia producer 43 is high immediately after the stop of the internal combustion engine 1, and hence the production efficiency of ammonia is high. Therefore, when ammonia is produced after the stop of the internal combustion engine 1, and produced ammonia is stored beforehand, then it is possible to supply stored ammonia to the NOx catalyst 3, even when the production efficiency of ammonia is low upon the startup of the internal combustion engine 1 next time. That is, it is possible to supply ammonia contained in the ammonia tank 42 to the NOx catalyst 3 even before the completion of the warming-up of the ammonia producer 43. As described above, when the production of ammonia is continued until the storage amount of ammonia arrives at a predetermined ammonia amount even after the stop of the internal combustion engine 1, it is thereby possible to suppress the shortage of ammonia upon the startup of the internal combustion engine 1 next time.

The predetermined ammonia amount can be an ammonia amount which makes it possible to purify the exhaust gas by the NOx catalyst 3 in a state in which it is difficult to produce ammonia by the ammonia producer 43. For example, the predetermined ammonia amount may be an ammonia amount which is required to purify NOx allowed to flow into the NOx catalyst 3 until the warming-up of the ammonia producer is completed after the startup of the internal combustion engine. Alternatively, the predetermined ammonia amount may be an ammonia amount which is larger than that described above.

FIG. 5 shows a flow chart illustrating a flow to produce ammonia even after the stop of the internal combustion engine 1. This routine is executed by ECU 10 every time when a predetermined time elapses.

In Step S401, it is judged whether or not the internal combustion engine 1 is stopped. It is judged that the internal combustion engine 1 is stopped, for example, if a driver turns a key switch to the position of IG-OFF or if predetermined automatic stop conditions are established for an internal combustion engine 1 which is to be automatically stopped irrelevant to the intension of the driver when the predetermined automatic stop conditions are established. Alternatively, it is also allowable to judge whether or not the number of revolutions of the internal combustion engine 1 is zero, in place of the judgment to judge whether or not the internal combustion engine 1 is stopped. If the affirmative judgment is made in Step S401, the routine proceeds to Step S402. On the other hand, if the negative judgment is made, this routine is completed.

In Step S402, the storage amount of ammonia contained in the ammonia tank 42 is measured. The measurement is performed by the ammonia amount sensor 42C.

In Step S403, it is judged whether or not the storage amount of ammonia measured in Step S402 is less than a predetermined ammonia amount. In this step, it is judged whether or not the ammonia amount stored in the ammonia tank 42 is smaller than an ammonia amount which is sufficient to purify NOx by means of the NOx catalyst 3. The predetermined ammonia amount is previously determined, for example, by an experiment or simulation. If the affirmative judgment is made in Step S403, the routine proceeds to Step S404. On the other hand, if the negative judgment is made, the routine proceeds to Step S405.

In Step S404, ammonia is produced by the ammonia producer 43. That is, the nitrogen and the water vapor are supplied to the ammonia producer 43 even after the internal combustion engine 1 is stopped, and thus ammonia is electrolytically synthesized. Produced ammonia is stored in the ammonia tank 42. The production of ammonia is completed when the ammonia amount stored in the ammonia tank 42 is not less than a predetermined ammonia amount. In this procedure, in Step S404, it is also allowable that the production of ammonia is started immediately. However, ammonia may be produced after waiting for the establishment of the other conditions to produce ammonia. If the internal combustion engine 1 is stopped before the completion of the warming-up of the ammonia producer 43, it is also allowable that ammonia is not produced. If the internal combustion engine 1 is stopped before the completion of the warming-up of the ammonia producer 43, it is also allowable that the temperature of the ammonia producer 43 is raised after the stop of the internal combustion engine 1 and the production of ammonia is started after the completion of the warming-up of the ammonia producer 43. Even when the production of ammonia is performed after the stop of the internal combustion engine 1, if such a state is given that it is difficult to produce ammonia, then it is also allowable that the production of ammonia is stopped before the ammonia amount stored in the ammonia tank 42 is not less than a predetermined ammonia amount. For example, if the temperature of the ammonia producer 43 is lowered after the stop of the internal combustion engine 1, and it is difficult to produce ammonia, then it is also allowable that the production of ammonia is stopped. If it is feared that the remaining battery charge amount may be decreased to such an extent that it will be difficult to start up the internal combustion engine 1 next time, it is also allowable that ammonia is not produced.

On the other hand, in Step S405, ammonia is not produced by the ammonia producer 43. In this step, the separation of the nitrogen and the supply of the nitrogen to be performed by the nitrogen supplier 44, the production of the water vapor and the supply of the water vapor to be performed by the water supplier 45, and the electrolytic synthesis of ammonia to be performed by the ammonia producer 43 are stopped in conformity with the stop of the internal combustion engine 1. In Step S405, it is assumed that ammonia is not produced, because a sufficient amount of ammonia is stored in the ammonia tank 42. However, in place thereof, it is also allowable that ammonia is produced until arrival at the capacity or volume of the ammonia tank 42.

In this way, even in such a state that ammonia cannot be produced by the ammonia producer 43, it is possible to previously store a sufficient amount of ammonia in the ammonia tank 42 after the stop of the internal combustion engine 1. Therefore, it is possible to suppress the shortage of ammonia. That is, it is possible to supply ammonia to the NOx catalyst 3 before the completion of the warming-up of the ammonia producer 43 upon the startup of the internal combustion engine 1 next time or even before the completion of the production of the water vapor by the water supplier 45.

Example 6

In this embodiment, when an internal combustion engine 1, which is capable of performing the automatic stop, is provided, ammonia is produced while prohibiting the automatic stop of the internal combustion engine 1 until the ammonia amount contained in the ammonia tank 42 is not less than a predetermined ammonia amount. If predetermined automatic stop conditions are established, ECU 10 stops the internal combustion engine 1 irrelevant to the intension of a driver of a vehicle. The other devices or the like are the same as those of the first embodiment, any explanation of which will be omitted. In this embodiment and the following embodiments, ECU 10, which automatically stops the internal combustion engine 1, corresponds to the controller of the present invention.

In this case, if the internal combustion engine 1 is stopped in a state in which the ammonia amount contained in the ammonia tank 42 is small, it is feared that ammonia may be in shortage upon the startup of the internal combustion engine 1 next time. For example, the temperature of the ammonia producer 43 is low immediately after the startup of the internal combustion engine 1, and hence the production efficiency of ammonia is low. In this case, it is also conceived that ammonia is produced after the stop of the internal combustion engine 1 as in the fifth embodiment. However, if the electric power is consumed in order to produce ammonia, it is feared that the remaining battery charge amount may be in shortage.

On the contrary, if the automatic stop of the internal combustion engine 1 is prohibited until the ammonia amount contained in the ammonia tank 42 becomes not less than a predetermined ammonia amount, it is thereby possible to generate the required electric power by means of the internal combustion engine 1. Further, when the heat of the exhaust gas is used to maintain the temperature of the molten salt, it is possible to maintain the temperature of the molten salt at an appropriate temperature by prohibiting the automatic stop of the internal combustion engine 1. Further, for example, when the cooling water of the internal combustion engine 1 is used to condense the water in the condenser 45A, it is possible to facilitate the condensation of the water by prohibiting the automatic stop of the internal combustion engine 1. Therefore, it is possible to promptly produce ammonia.

Ammonia is previously stored in the ammonia tank 42 when the automatic stop of the internal combustion engine 1 is prohibited. Accordingly, even in such a state that it is difficult to produce ammonia by the ammonia producer 43, it is possible to supply ammonia from the ammonia tank 42 to the NOx catalyst 3. ECU 10 may stop the internal combustion engine 1 if the ammonia amount stored in the ammonia tank 42 arrives at a predetermined ammonia amount and the other automatic stop conditions are established.

The predetermined ammonia amount can be an ammonia amount which makes it possible to purify the exhaust gas by means of the NOx catalyst 3 in a state in which it is difficult to produce ammonia by the ammonia producer 43. For example, the predetermined ammonia amount can be an ammonia amount to be supplied to the NOx catalyst 3 until the completion of the warming-up of the ammonia producer 43 upon the startup of the internal combustion engine 1 next time.

FIG. 6 shows a flow chart illustrating a flow to produce ammonia while prohibiting the automatic stop of the internal combustion engine 1. This routine is executed by ECU 10 every time when a predetermined time elapses. The steps, in which the same processes as those of the flow described above are performed, are designated by the same reference numerals, any explanation of which will be omitted.

In this routine, if the affirmative judgment is made in Step S403, the routine proceeds to Step S501 to prohibit the automatic stop of the internal combustion engine 1. After that, the routine proceeds to Step S404, and ammonia is produced. The order of Step S501 and Step S404 may be changed. The predetermined ammonia amount in Step S403 may have the same value as that in the fifth embodiment. However, it is also possible to provide a different value. The predetermined ammonia amount is previously determined, for example, by an experiment or simulation. In this procedure, in Step S404, it is also allowable that the production of ammonia is started immediately. However, it is also allowable that ammonia is produced after waiting for the establishment of the other conditions to produce ammonia. In Step S405, it is assumed that ammonia is not produced, because a sufficient amount of ammonia is stored in the ammonia tank 42. However, in place thereof, it is also allowable that ammonia is produced until arrival at the capacity or volume of the ammonia tank 42.

FIG. 7 shows a flow chart illustrating a flow to judge whether or not the automatic stop of the internal combustion engine 1 is carried out. This routine is executed by ECU 10 every time when a predetermined time elapses.

In Step S502, it is judged whether or not the automatic stop condition is established. If the automatic stop of the internal combustion engine 1 is prohibited at least in Step S501 of the flow shown in FIG. 6, it is judged that the automatic stop condition is not established. That is, the fact that the automatic stop of the internal combustion engine 1 is not prohibited is one of the automatic stop conditions of the internal combustion engine 1. Even when the negative judgment is made is Step S403, if the other automatic stop conditions are not established, then the negative judgment is made in Step S502. For example, if the vehicle velocity is larger than zero, it is judged that the other automatic stop conditions are not established. On the other hand, when the negative judgment is made is Step S403 of the flow shown in FIG. 6, if the other automatic stop conditions are established, then the affirmative judgment is made in Step S502. One of the other automatic stop conditions can be exemplified, for example, by the fact that the vehicle velocity is zero.

If the affirmative judgment is made in Step S502, then the routine proceeds to Step S503, and the automatic stop of the internal combustion engine 1 is carried out. On the other hand, if the negative judgment is made in Step S502, then the routine proceeds to Step S504, and the automatic stop of the internal combustion engine 1 is not carried out.

In this way, the production of ammonia is continued while prohibiting the automatic stop of the internal combustion engine 1 until the ammonia amount contained in the ammonia tank 42 becomes not less than a predetermined ammonia amount. Therefore, a sufficient amount of ammonia is stored in the ammonia tank 42 upon the startup of the internal combustion engine 1. Therefore, even in the case of such a situation that it is impossible to produce ammonia by the ammonia producer 43, it is possible to purify NOx by using ammonia having been previously stored in the ammonia tank 42 when the automatic stop of the internal combustion engine 1 is prohibited.

Example 7

In this embodiment, the production of ammonia is continued while prohibiting the automatic stop of the internal combustion engine 1, when ammonia is produced by the ammonia producer 43. The other devices or the like are the same as those of the first embodiment, any explanation of which will be omitted.

In this embodiment, the automatic stop of the internal combustion engine 1 is prohibited when ammonia is produced, irrelevant to the ammonia amount stored in the ammonia tank 42. In this embodiment, it is also allowable that the ammonia tank 42 is not provided. In this case, it is also allowable that ammonia is adsorbed to the NOx catalyst 3 so that the purification of NOx can be performed immediately after the startup of the internal combustion engine 1 next time. If the production of ammonia is completed, and the other automatic stop conditions are established, then the automatic stop of the internal combustion engine 1 is carried out.

When the ammonia tank 42 is provided, if ammonia is stored beforehand therein, then it is possible to supply ammonia contained in the ammonia tank 42 to the NOx catalyst 3 immediately after the startup of the internal combustion engine 1 next time. Further, when the automatic stop of the internal combustion engine 1 is prohibited, it is thereby possible to heat the ammonia producer 43 by utilizing the exhaust gas of the internal combustion engine 1. Therefore, it is possible to raise the production efficiency of ammonia. Further, when the internal combustion engine 1 is operated, it is thereby possible to secure the electric power required to produce ammonia. Further, it is also possible to circulate, for example, the cooling water of the internal combustion engine 1 to the condenser 45A.

FIG. 8 shows a flow chart illustrating a flow to produce ammonia while prohibiting the automatic stop of the internal combustion engine 1. This routine is executed by ECU 10 every time when a predetermined time elapses. The steps, in which the same processes as those of the flow described above are performed, are designated by the same reference numerals, any explanation of which will be omitted.

In Step S601, it is judged whether or not ammonia is being produced by the ammonia producer 43. If the step of producing ammonia is started although ammonia is not actually generated by the ammonia producer 43, it is also allowable to judge that ammonia is produced. For example, if the water vapor is supplied from the water supplier 45 to the ammonia producer 43, the nitrogen is supplied from the nitrogen supplier 44 to the ammonia producer 43, and the voltage is applied to the anode 43B and the cathode 43C, then it is possible to judge that the step of producing ammonia is started. If the affirmative judgment is made in Step S601, the routine proceeds to Step S501 to prohibit the automatic stop of the internal combustion engine 1. On the other hand, if the negative judgment is made in Step S601, this routine is completed.

Further, ECU 10 judges whether or not the automatic stop of the internal combustion engine 1 is carried out on the basis of the flow shown in FIG. 7. If the automatic stop of the internal combustion engine 1 is prohibited at least in Step S501 of the flow shown in FIG. 8, it is judged that the automatic stop condition is not established. That is, the fact that the automatic stop of the internal combustion engine 1 is not prohibited is one of the automatic stop conditions of the internal combustion engine 1. Even when the negative judgment is made in Step S601, if the other automatic stop conditions are not established, then the negative judgment is made in Step S502. On the other hand, when the negative judgment is made in Step S601 of the flow shown in FIG. 8, if the other automatic stop conditions are established, then the affirmative judgment is made in Step S502. For example, the fact that the vehicle velocity is zero can be exemplified as one of the other automatic stop conditions.

In this way, it is possible to previously store a sufficient amount of ammonia in the ammonia tank 42 when the automatic stop of the internal combustion engine 1 is prohibited. Therefore, it is possible to supply stored ammonia to the NOx catalyst 3 even in such a state that it is impossible to produce ammonia by the ammonia producer 43. Further, when the automatic stop of the internal combustion engine 1 is prohibited, it is thereby possible to heat the ammonia producer 43 by utilizing the exhaust gas of the internal combustion engine 1. Therefore, it is possible to raise the production efficiency of ammonia. Further, when the ammonia tank 42 is not provided, if ammonia is supplied to the NOx catalyst 3 while producing ammonia by prohibiting the automatic stop of the internal combustion engine 1, then it is possible to adsorb ammonia by the NOx catalyst 3 beforehand.

Example 8

In this embodiment, the water is condensed while prohibiting the automatic stop of the internal combustion engine 1 until the amount of water contained in the water tank 45B is not less than a predetermined water amount when an internal combustion engine 1, which is capable of performing the automatic stop, is provided. If the predetermined automatic stop conditions are established, ECU 10 stops the internal combustion engine 1 irrelevant to the intention of a driver of a vehicle. The other devices or the like are the same as those of the first embodiment, any explanation of which will be omitted.

In this procedure, if the electric power is required to store the water, it is possible to generate the required electric power by the internal combustion engine 1 by prohibiting the automatic stop of the internal combustion engine 1. If the internal combustion engine 1 is operated, the exhaust gas, which contains a large amount of water vapor, can be continuously supplied to the condenser 45A. Therefore, it is possible to facilitate the condensation of the water. When the water is previously stored in the water tank 45B, it is thereby possible to supply the water from the water tank 45B to the vaporizer 45C even in such a state that it is difficult to condense the water by the condenser 45A. ECU 10 may permit the automatic stop of the internal combustion engine 1, if the amount of water stored in the water tank 45B arrives at a predetermined amount of water and the other automatic stop conditions are established. In this way, the liquid water is continuously stored until the storage amount of water arrives at the predetermined amount of water, and thus it is possible to suppress the shortage of the liquid water upon the production of ammonia next time.

The predetermined amount of water can be an amount of water which makes it possible to produce ammonia by means of the ammonia producer 43 so that ammonia is not in shortage when ammonia is supplied to the NOx catalyst 3 even when the water is not condensed by the condenser 45A. Alternatively, the predetermined amount of water may be an amount of water which is required to produce ammonia when the internal combustion engine 1 is started up next time. Further alternatively, the predetermined amount of water may be an amount of water which is required to produce ammonia by means of the ammonia producer 43 during the period ranging from the startup of the internal combustion engine 1 to the condensation of the water. Further alternatively, the predetermined amount of water may be an amount of water which is required to produce ammonia by means of the ammonia producer 43 until the condensation of the water is completed by the condenser 45A.

FIG. 9 shows a flow chart illustrating a flow to condense the water while prohibiting the automatic stop of the internal combustion engine 1. This routine is executed by ECU 10 every time when a predetermined time elapses. The steps, in which the same processes as those of the flow described above are performed, are designated by the same reference numerals, any explanation of which will be omitted.

In this routine, if the affirmative judgment is made in Step S203, the routine proceeds to Step S501 to prohibit the automatic stop of the internal combustion engine 1. After that, the routine proceeds to Step S204, and the water is condensed. The order of Step S501 and Step S204 may be changed. The predetermined water amount in Step S203 may have the same value as that in the third embodiment. However, it is also possible to provide a different value. The predetermined water amount is previously determined, for example, by an experiment or simulation. In Step S204, it is also allowable that the condensation of the water is started immediately. However, it is also allowable that the water is condensed when the other conditions to condense the water are also established. In Step S205, it is assumed that the water is not condensed, because a sufficient amount of water is stored in the water tank 45B. However, in place thereof, it is also allowable that the water is condensed until arrival at the capacity or volume of the water tank 45B.

Further, ECU 10 judges whether or not the automatic stop of the internal combustion engine 1 is carried out on the basis of the flow shown in FIG. 7. If the automatic stop of the internal combustion engine 1 is prohibited at least in Step S501 of the flow shown in FIG. 9, it is judged that the automatic stop condition is not established. That is, the fact that the automatic stop of the internal combustion engine 1 is not prohibited is one of the automatic stop conditions of the internal combustion engine 1. Even when the negative judgment is made in Step S203, if the other automatic stop conditions are not established, then the negative judgment is made in Step S502. For example, if the vehicle velocity is larger than zero, it is judged that the other automatic stop conditions are not established. On the other hand, when the negative judgment is made in Step S203 of the flow shown in FIG. 9, if the other automatic stop conditions are established, then the affirmative judgment is made in Step S502. For example, the fact that the vehicle velocity is zero can be exemplified as one of the other automatic stop conditions.

In this way, if the water is previously stored in the water tank 45B when the automatic stop of the internal combustion engine 1 is prohibited, then it is possible to supply the water to the ammonia producer 43 immediately after the startup of the internal combustion engine 1 next time. Further, when the internal combustion engine 1 is in operation, it is possible to supply a larger amount of the exhaust gas to the condenser 45A. Therefore, it is possible to promptly increase the amount of water contained in the water tank 45B. In this way, it is possible to produce ammonia by using the water previously stored in the water tank 45B even in such a state that it is impossible to condense the water by the condenser 45A or in such a state that the condensation of the water delays.

Example 9

In this embodiment, when the water is condensed by the condenser 45A, the condensation of the water is continued while prohibiting the automatic stop of the internal combustion engine 1. The other devices or the like are the same as those of the first embodiment, any explanation of which will be omitted.

In this embodiment, the automatic stop of the internal combustion engine is prohibited when the water is condensed irrelevant to the amount of water stored in the water tank 45B. In this embodiment, it is also allowable that the water tank 45B is not provided. In this case, for example, it is also allowable that ammonia, which is produced by using the water condensed at this time, is stored in the ammonia tank 42. If the condensation of the water is completed, and the other automatic stop conditions are established, then the automatic stop of the internal combustion engine 1 is carried out.

When the water tank 45B is provided, if the water is stored therein, then it is possible to supply the water to the vaporizer 45C immediately after the startup of the internal combustion engine 1 next time. Further, the automatic stop of the internal combustion engine 1 is prohibited, and thus it is possible to condense the water by utilizing the cooling water of the internal combustion engine 1. Therefore, it is possible to raise the efficiency to condense the water. Further, if the electric power is required to condense the water, the internal combustion engine 1 is operated beforehand. Thus, it is possible to secure the electric power required to condense the water.

FIG. 10 shows a flow chart illustrating a flow to condense the water while prohibiting the automatic stop of the internal combustion engine 1. This routine is executed by ECU 10 every time when a predetermined time elapses. The steps, in which the same processes as those of the flow described above are performed, are designated by the same reference numerals, any explanation of which will be omitted.

In Step S801, it is judged whether or not the water is being condensed by the condenser 45A. If the step of condensing the water is started although the water is not actually condensed by the condenser 45A, it is also allowable to judge that the water is condensed. For example, if the exhaust gas is allowed to flow through the exhaust gas intake passage 45D, and the heating medium, which is used to perform the heat exchange with the exhaust gas, is allowed to flow through the condenser 45A, then it is possible to judge that the step of condensing the water is started. If the affirmative judgment is made in Step S801, the routine proceeds to Step S501 to prohibit the automatic stop of the internal combustion engine 1. On the other hand, if the negative judgment is made in Step S801, this routine is completed.

Further, ECU 10 judges whether or not the automatic stop of the internal combustion engine 1 is carried out, on the basis of the flow shown in FIG. 7. If the automatic stop of the internal combustion engine 1 is prohibited at least in Step S501 of the flow shown in FIG. 10, it is judged that the automatic stop condition is not established. That is, the fact that the automatic stop of the internal combustion engine 1 is not prohibited is one of the automatic stop conditions of the internal combustion engine 1. Even when the negative judgment is made is Step S801, if the other automatic stop conditions are not established, then the negative judgment is made in Step S502. On the other hand, when the negative judgment is made is Step S801 of the flow shown in FIG. 10, if the other automatic stop conditions are established, then the affirmative judgment is made in Step S502. One of the other automatic stop conditions can be exemplified, for example, by the fact that the vehicle velocity is zero.

In this way, it is possible to previously store a sufficient amount of the liquid water in the water tank 45B when the automatic stop of the internal combustion engine 1 is prohibited. Therefore, even in such a state that it is impossible to condense the water by the condenser 45A, it is possible to produce ammonia by using the water stored beforehand. Further, it is possible to condense the water by utilizing the cooling water of the internal combustion engine 1 by prohibiting the automatic stop of the internal combustion engine 1. Therefore, it is possible to raise the efficiency to condense the water. Further, it is possible to supply a larger amount of the exhaust gas to the condenser 45A if the internal combustion engine 1 is in operation. Therefore, it is possible to promptly increase the amount of water contained in the water tank 45B.

Example 10

In this embodiment, the water is condensed until the amount of water contained in the water tank 45B is not less than a predetermined amount of water even after the stop of the internal combustion engine 1. The other devices or the like are the same as those of the first embodiment, any explanation of which will be omitted.

In this procedure, when the water is previously stored in the water tank 45B after the stop of the internal combustion engine 1, it is thereby possible to supply the water from the water tank 45B to the vaporizer 45C even in such a state that it is difficult to condense the water by the condenser 45A. For example, it takes a certain extent of time to condense the water by the condenser 45A. That is, even when the condensation of the water is started immediately after the startup of the internal combustion engine 1, it is impossible to immediately condense the water. Therefore, it is feared that the liquid water may be in shortage. Therefore, it is difficult to produce ammonia until the water is condensed. It is feared that ammonia to be supplied to the NOx catalyst 3 may be in shortage. On the other hand, when the water is stored in the water tank 45B beforehand, it is thereby unnecessary to wait until the water is condensed after the startup of the internal combustion engine 1 next time. Therefore, the water can be promptly supplied to the vaporizer 45C to generate the water vapor, and the water vapor can be supplied to the ammonia producer 43. Accordingly, it is possible to promptly produce ammonia after the startup of the internal combustion engine 1. In this way, when the liquid water is continuously stored until the storage amount of water in the water tank 45B arrives at a predetermined amount of water, it is possible to suppress the shortage of the water when ammonia is produced next time.

The predetermined amount of water may be an amount of water which makes it possible to produce ammonia by the ammonia producer 43 so that ammonia is not in shortage when ammonia is supplied to the NOx catalyst 3 even when the water is not condensed by the condenser 45A. Alternatively, the predetermined amount of water may be an amount of water which is required to produce ammonia when the internal combustion engine 1 is started up next time. Further alternatively, the predetermined amount of water may be an amount of water which is required to produce ammonia by the ammonia producer 43 during the period ranging from the startup of the internal combustion engine 1 to the condensation of the water. Further alternatively, the predetermined amount of water may be an amount of water which is required to produce ammonia by the ammonia producer 43 until the condensation of the water is completed by the condenser 45A.

Even after the stop of the internal combustion engine 1, it is possible to condense the water from the exhaust gas, because the exhaust gas allowed to come from the internal combustion engine 1 exists in the exhaust gas passage 2. For example, if a pump is provided for the exhaust gas intake passage 45D, it is possible to supply the exhaust gas of the internal combustion engine 1 to the condenser 45A by operating the pump even after the stop of the internal combustion engine 1. Further, it is also possible to allow the exhaust gas to flow, for example, by utilizing the difference in temperature between the condenser 45A and the exhaust gas passage 2.

FIG. 11 shows a flow chart illustrating a flow to condense the water even after the stop of the internal combustion engine 1. This routine is executed by ECU 10 every time when a predetermined time elapses. The steps, in which the same processes as those of the flow described above are performed, are designated by the same reference numerals, any explanation of which will be omitted.

In this routine, it is judged in Step S401 whether or not the internal combustion engine 1 is stopped. If the affirmative judgment is made in Step S401, the routine proceeds to Step S202. On the other hand, if the negative judgment is made, this routine is completed.

In Step S202, the storage amount of water in the water tank 45B is measured. In Step S203, it is judged whether or not the storage amount of water measured in Step S202 is less than a predetermined amount of water. The predetermined amount of water is previously determined, for example, by an experiment or simulation. If the affirmative judgment is made in Step S203, the routine proceeds to Step S204. On the other hand, if the negative judgment is made, the routine proceeds to Step S205.

In Step S204, the water is condensed by the condenser 45A. For example, in order to condense the water by the condenser 45A, the exhaust gas is allowed to flow through the exhaust gas intake passage 45D. Further, the heating medium, which performs the heat exchange with the exhaust gas, is allowed to flow through the condenser 45A. The condensation of the water is completed when the amount of water stored in the water tank 45B is not less than a predetermined amount of water. In this procedure, in Step S204, it is also allowable that the condensation of the water is started immediately. However, it is also allowable that the water is condensed after waiting for the establishment of the other conditions to condense the water. If it is feared that the remaining battery charge amount may be decreased to such an extent that it will be difficult to start up the internal combustion engine 1 next time, it is also allowable that the water is not condensed. Further, if a sufficient amount of ammonia is stored in the ammonia tank 42, and it is unnecessary to produce ammonia immediately after the startup of the internal combustion engine 1 next time, it is also allowable that the water is not condensed.

On the other hand, in Step S205, the water is not condensed by the condenser 45A. For example, the exhaust gas is not allowed to flow through the exhaust gas intake passage 45D. Further, the heating medium, which performs the heat exchange with the exhaust gas, is not allowed to flow through the condenser 45A. In Step S205, it is assumed that the water is not condensed, because the sufficient amount of water is stored in the water tank 45B. However, in place thereof, it is also allowable that the water is condensed until arrival at the capacity or volume of the water tank 45B.

In this way, it is possible to previously store a sufficient amount of the water in the water tank 45B after the stop of the internal combustion engine 1 even in such a state that it is impossible to condense the water by the condenser 45A. Therefore, it is possible to suppress the shortage of the water when ammonia is produced. Thus, it is possible to promptly produce ammonia upon the startup of the internal combustion engine 1 next time.

Example 11

In this embodiment, the ammonia tank 42 is not provided. FIG. 12 shows a schematic arrangement of an exhaust gas purification apparatus for the internal combustion engine 1 when no ammonia tank 42 is provided. With reference to FIG. 12, the ammonia tank 42, the ammonia amount sensor 42C, and the second ammonia passage 42B shown in FIG. 1 are not provided. One end of the first ammonia passage 42A is connected to the vessel 43A. Further, the other end of the first ammonia passage 42A is connected to the injection valve 41. The other devices or the like are designated by the same reference numerals as those of FIG. 1, any explanation of which will be omitted.

When the ammonia tank 42 is omitted as shown in FIG. 12, ammonia is thereby produced by the ammonia producer 43 every time when ammonia is supplied from the injection valve 41. Accordingly, it is possible to reduce the number of parts.

Example 12

In this embodiment, the water tank 45B is not provided. FIG. 13 shows a schematic arrangement of an exhaust gas purification apparatus for the internal combustion engine 1 when no water tank 45B is provided. With reference to FIG. 13, the water tank 45B, the second condensed water passage 45F, and the water amount sensor 45H shown in FIG. 1 are not provided. Further, the condenser 45A and the vaporizer 45C are connected to one another via the first condensed water passage 45E. The other devices or the like are designated by the same reference numerals as those of FIG. 1, any explanation of which will be omitted.

When the water tank 45B is omitted as shown in FIG. 13, then the water is thereby condensed by the condenser 45A, and the water is vaporized by the vaporizer 45C every time when ammonia is produced. Accordingly, it is possible to reduce the number of parts. It is also allowable that both of the water tank 45B and the ammonia tank 42 are not provided.

REFERENCE SIGNS LIST

1: internal combustion engine, 2: exhaust gas passage, 3: selective catalytic reduction NOx catalyst, 4: ammonia supplier, 7: NOx sensor, 10: ECU, 11: crank position sensor, 12: accelerator opening degree sensor, 41: injection valve, 42: ammonia tank, 42A: first ammonia passage, 42B: second ammonia passage, 42C: ammonia amount sensor, 43: ammonia producer, 43A: vessel, 43B: anode, 43C: cathode, 43D: power source, 43E: oxygen passage, 44: nitrogen supplier, 44A: air passage, 44B: nitrogen passage, 45: water supplier, 45A: condenser, 45B: water tank, 45C: vaporizer, 45D: exhaust gas intake passage, 45E: first condensed water passage, 45F: second condensed water passage, 45G: water vapor passage, 45H: water amount sensor.

The invention claimed is:

1. An exhaust gas purification apparatus for an internal combustion engine, comprising:
a catalyst which is provided at an exhaust gas passage of the internal combustion engine and configured to purify an exhaust gas of the internal combustion engine by using ammonia; and
an ammonia supplier that supplies the ammonia to the catalyst, wherein the ammonia supplier includes:
an ammonia producer that produces the ammonia from nitrogen and water;
a nitrogen supplier that separates the nitrogen from air and supply the nitrogen to the ammonia producer; and
a water supplier that separates the water from the exhaust gas of the internal combustion engine and supply the water to the ammonia producer, wherein the water supplier includes: a condenser configured to condense the water contained in the exhaust gas of the internal combustion engine; and a vaporizer configured to convert the water condensed by the condenser into water vapor.

2. The exhaust gas purification apparatus for the internal combustion engine according to claim 1, wherein:
the water supplier separates the water from the exhaust gas of the internal combustion engine and the water supplier supplies the water in a state of water vapor to the ammonia producer; and
the ammonia producer electrolytically synthesizes the ammonia.

3. The exhaust gas purification apparatus for the internal combustion engine according to claim 1, wherein the ammonia producer includes:
a molten salt vessel configured to store a molten salt; and
a pair of electrodes which are provided in the molten salt vessel, wherein:
the nitrogen supplier supplies the nitrogen to the molten salt vessel;
the water supplier supplies the water to the molten salt vessel; and
the ammonia producer electrolytically synthesizes the ammonia by applying electricity to the electrodes.

4. The exhaust gas purification apparatus for the internal combustion engine according to claim 1, wherein the water supplier includes a water tank configured to store at least one of the water condensed by the condenser and the water obtained by recondensing the water vapor converted from the water by the vaporizer.

5. The exhaust gas purification apparatus for the internal combustion engine according to claim 4, wherein the water supplier condenses the water by means of the condenser even when the ammonia is not produced by the ammonia producer, and the water condensed by the condenser is stored in the water tank.

6. The exhaust gas purification apparatus for the internal combustion engine according to claim 4, wherein the water supplier condenses the water by means of the condenser even after the internal combustion engine stops, and the water condensed by the condenser is stored in the water tank, if an amount of water stored in the water tank is less than a predetermined amount of water.

7. The exhaust gas purification apparatus for the internal combustion engine according to claim 4, further comprising:
a controller comprising at least one processor configured to cause automatic stop of the internal combustion engine, wherein:
the controller prohibits the automatic stop of the internal combustion engine if an amount of water stored in the water tank is less than a predetermined amount of water; and
the water supplier condenses the water by means of the condenser if the amount of water stored in the water tank is less than the predetermined amount of water, and the water condensed by the condenser is stored in the water tank.

8. The exhaust gas purification apparatus for the internal combustion engine according to claim 1, further comprising:
a controller comprising at least one processor configured to cause automatic stop of the internal combustion engine, wherein:
the controller prohibits the automatic stop of the internal combustion engine if the water is condensed by the condenser.

9. The exhaust gas purification apparatus for the internal combustion engine according to claim 1, wherein:
the water supplier includes an exhaust gas intake passage which is a passage for intaking the exhaust gas from a portion of the exhaust gas passage disposed on a downstream side from the catalyst; and
the water supplier separates the water from the exhaust gas intake via the exhaust gas intake passage.

10. The exhaust gas purification apparatus for the internal combustion engine according to claim 9, wherein the water supplier separates the water from the exhaust gas intake via the exhaust gas intake passage when NOx is purified by the catalyst.

11. An exhaust gas purification apparatus for an internal combustion engine, comprising:
a catalyst which is provided at an exhaust gas passage of the internal combustion engine and configured to purify an exhaust gas of the internal combustion engine by using ammonia;
an ammonia supplier that supplies the ammonia to the catalyst, wherein the ammonia supplier includes:
an ammonia producer that produces the ammonia from nitrogen and water;

a nitrogen supplier that separates the nitrogen from air and supply the nitrogen to the ammonia producer;

a water supplier that separates the water from the exhaust gas of the internal combustion engine and supply the water to the ammonia producer, and an ammonia tank that stores the ammonia produced by the ammonia producer, and a controller comprising at least one processor configured to cause automatic stop of the internal combustion engine, wherein the controller prohibits the automatic stop of the internal combustion engine if an amount of ammonia stored in the ammonia tank is less than a predetermined ammonia amount, and wherein the ammonia producer produces the ammonia and the produced ammonia is stored in the ammonia tank, if the amount of ammonia stored in the ammonia tank is less than the predetermined ammonia amount.

12. The exhaust gas purification apparatus for the internal combustion engine according to claim 11, wherein the ammonia producer produces the ammonia and the produced ammonia is stored in the ammonia tank, even after the internal combustion engine stops, if an amount of ammonia stored in the ammonia tank is less than a predetermined ammonia amount.

13. An exhaust gas purification apparatus for an internal combustion engine, comprising:

a catalyst which is provided at an exhaust gas passage of the internal combustion engine and configured to purify an exhaust gas of the internal combustion engine by using ammonia;

an ammonia supplier that supplies the ammonia to the catalyst, wherein the ammonia supplier includes:

an ammonia producer that produces the ammonia from nitrogen and water;

a nitrogen supplier that separates the nitrogen from air and supply the nitrogen to the ammonia producer;

a water supplier that separates the water from the exhaust gas of the internal combustion engine and supply the water to the ammonia producer, and a controller comprising at least one processor configured to cause automatic stop of the internal combustion engine, wherein the controller prohibits the automatic stop of the internal combustion engine if the ammonia is produced by the ammonia producer.

* * * * *